United States Patent
Kennedy et al.

(10) Patent No.: US 7,124,272 B1
(45) Date of Patent: Oct. 17, 2006

(54) FILE USAGE HISTORY LOG FOR IMPROVED PLACEMENT OF FILES IN DIFFERENTIAL RATE MEMORY ACCORDING TO FREQUENCY OF UTILIZATIONS AND VOLATILITY OF ALLOCATION SPACE

(75) Inventors: Mark K. Kennedy, Redondo Beach, CA (US); William Sobel, Cypress, CA (US)

(73) Assignee: Symantec Corporation, Cupertino, CA (US)

( * ) Notice: Subject to any disclaimer, the term of this patent is extended or adjusted under 35 U.S.C. 154(b) by 240 days.

(21) Appl. No.: 10/418,476

(22) Filed: Apr. 18, 2003

(51) Int. Cl.
    *G06F 12/00* (2006.01)
(52) U.S. Cl. ..................................... 711/173
(58) Field of Classification Search ............... None
    See application file for complete search history.

(56) References Cited

U.S. PATENT DOCUMENTS

| | | | |
|---|---|---|---|
| 5,333,311 A * | 7/1994 | Whipple, II | 707/205 |
| 5,463,776 A | 10/1995 | Voigt | 395/600 |
| 5,481,702 A | 1/1996 | Takahashi | 395/600 |
| 5,561,785 A | 10/1996 | Blandy | 395/497 |
| 5,561,786 A | 10/1996 | Morse | 395/497 |
| 5,574,907 A | 11/1996 | Jernigan, IV | 395/601 |
| 5,604,902 A | 2/1997 | Burkes | 395/622 |
| 5,623,654 A | 4/1997 | Peterman | 395/622 |
| 5,778,392 A | 7/1998 | Stockman et al. | |
| 5,802,593 A | 9/1998 | Grimsrud | |
| 5,829,023 A * | 10/1998 | Bishop | 711/118 |
| 6,839,802 B1 * | 1/2005 | Dimitri et al. | 711/112 |

OTHER PUBLICATIONS

Ferreira, P. et al., "Distribution and Persistence in Multiple and Heterogeneous Address Spaces," *IEEE Comput. Soc. Press*, Dec. 1993.
Remedios, I., et al., "Parallel Algorithms for Optimal Data Allocation in a Dynamic CIM Network," *IEEE Comput. Soc. Press*, Jun. 1992.

* cited by examiner

*Primary Examiner*—Mano Padmanabhan
*Assistant Examiner*—Duc T Doan
(74) *Attorney, Agent, or Firm*—Fliesler Meyer LLP

(57) ABSTRACT

Improved file tracking methods and file re-positioning or file defragmenting mechanisms are disclosed for use with a differential rate memory device which has allocatable storage units disposed in regions of comparatively faster data access and of comparatively slower data access for storing retrievable data file contents in such regions.

40 Claims, 6 Drawing Sheets

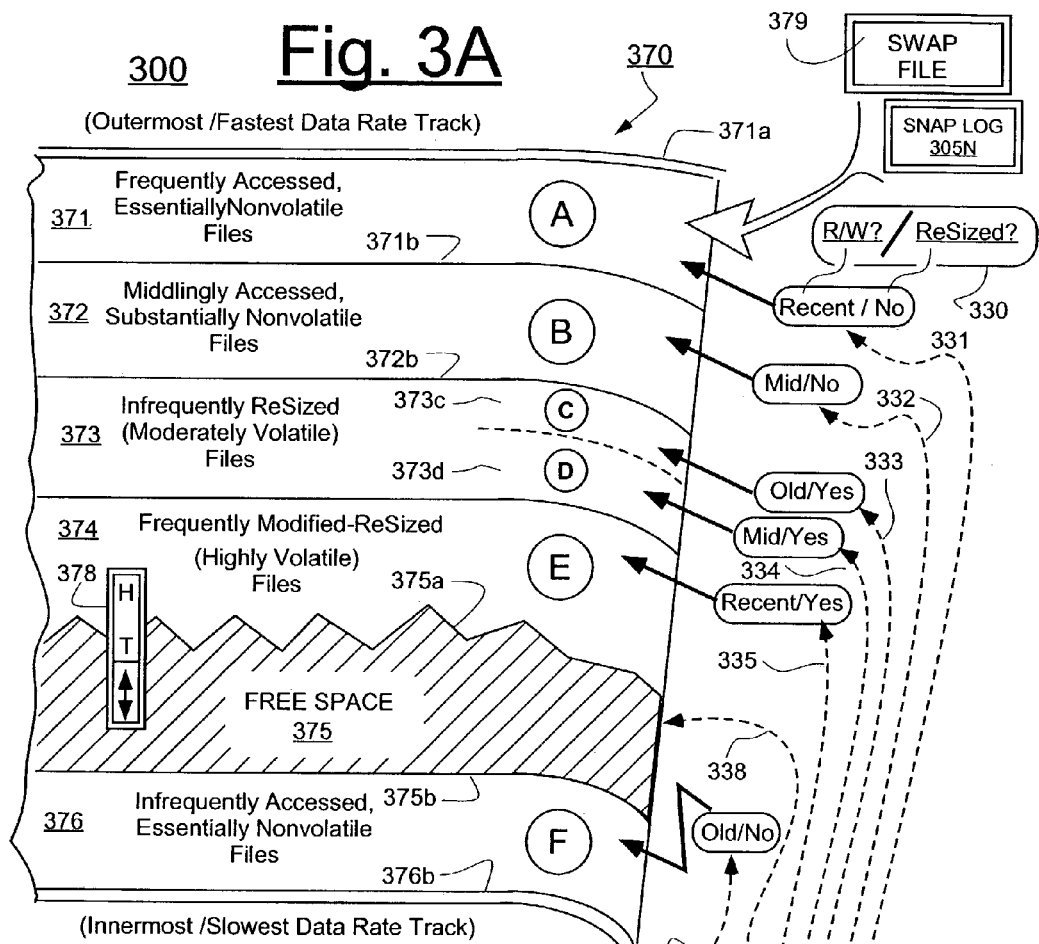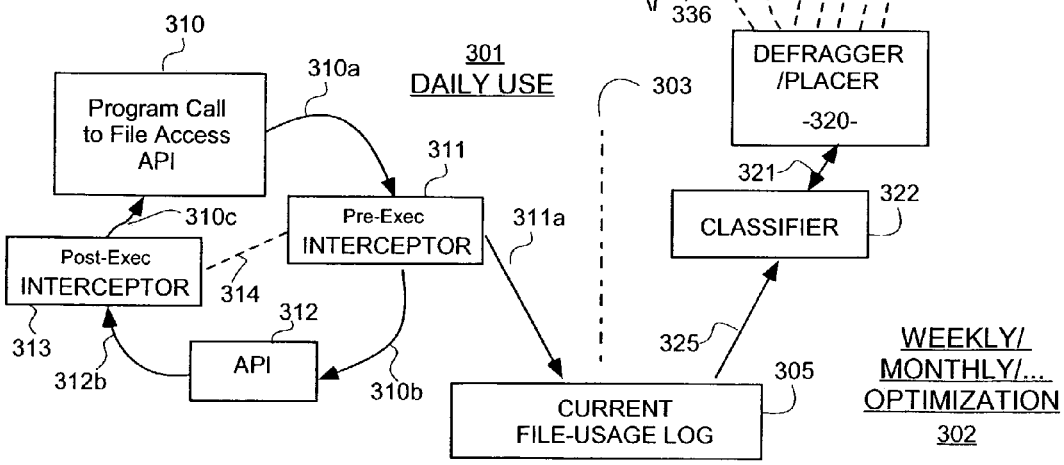

313'

380

500

FILE USAGE HISTORY LOG FOR IMPROVED PLACEMENT OF FILES IN DIFFERENTIAL RATE MEMORY ACCORDING TO FREQUENCY OF UTILIZATIONS AND VOLATILITY OF ALLOCATION SPACE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure of invention relates generally to computer file storing systems such as used in general purpose computers for storing data files. The disclosure is directed more specifically to differential rate memory systems such as rotating disks and the like where certain storage areas (e.g., outer tracks) exhibit greater access rates than do other storage areas (e.g., inner tracks). The disclosure is directed even more specifically to the problem of how to optimally place files within the storage areas of a differential rate memory system. The field of endeavor is sometimes referred to as disk optimization.

CROSS-REFERENCE TO RELATED APPLICATIONS

The disclosures of the following U.S. patents are incorporated herein by reference:

U.S. Pat. No. 5,778,392 issued Jun. 7, 1998 to Steven Stockman et al, and entitled, OPPORTUNISTIC TILE-PULLING, VACANCY FILLING METHOD AND APPARATUS FOR FILE-STRUCTURE REORGANIZATION; and U.S. Pat. No. 5,802,593 issued Sep. 1, 1998 to Knut Grimsrud and entitled METHOD AND APPARATUS FOR IMPROVING DISK DRIVE PERFORMANCE.

BACKGROUND

During normal usage of a data storage device, some computer files may be "used" more "frequently" than others. Certain allocatable areas (e.g., tracks or cylinders) of file storage systems may provide faster access rates than do others. For example, the above cited U.S. Pat. No. 5,778,392 of Stockman et al. teaches at col. 20, lines 43–49 that it may be desirable to monitor disk usage patterns, analyze the usage patterns, and then establish a goal state that places at the fastest portion of a disk, those files that are determined to be "most frequently used". Stockman et al. further teach an opportunistic tile-pulling method that may be used to defragment a disk according to a supplied, goal tile map.

However, it is not clear what criteria should be used to determine whether a given file is indeed being "used" more "frequently" than others. Neither the term, "used" nor the term, "frequently" is well defined. Consider for example, the case of a multitasking computer wherein many files are being "accessed" to one extent or another at substantially the same time by overlapping execution threads. How is it to be determined which of the files are being "most frequently" used and what constitutes a "use" that merits accounting for as opposed to a use that may not be worthwhile counting when measuring frequency of use? How is information about accountable "use" and its frequency to be gathered in a cost efficient manner? And what is to be done with the information once it is collected?

Certain background tasks of a computer system may be running substantially all the time, and may be "using" (reading from and/or writing to) certain, favorite files of theirs on a consistent basis. As a consequence, such background tasks may be consistently consuming a significant amount of the machine's processing bandwidth. A good example is a random access memory (RAM) extending algorithm which uses a so-called "swap file" to expand the apparent storage capacity of the RAM. It does so by moving less-often—used parts of RAM data onto disk while keeping more often used parts in RAM. When the less-often—used RAM data is referenced by a machine operation (e.g., for a data fetch or data write operation), the RAM-extending algorithm swaps that disk-held data into actual RAM while pushing other data out to the swap file to make room. Examples of preemptive types of multitasking operating systems (OS's) that use swap files include Microsoft Windows® all of which are available from Microsoft Corporation of Redmond, Wash.

For the novice end-user of a computer, it usually doesn't matter what specific programs are running in the background, or how "frequently" they run, or what specific files they "use", so long as foreground operations appear to proceed at an acceptably quick pace on the given computer system (hardware platform). However, because foreground and background tasks often do compete with one another for slices of a finite system bandwidth, the apparent speed of a foreground task may be appreciably enhanced or degraded by tuning the file-utilizing speeds of background tasks.

It may often be beneficial for the end-user (or for an automated agent acting on behalf of such a user) to periodically tune the placement on his or her hard disk (and/or on other such mass-storage devices) of various foreground and background-used files so that more frequently used ones of the files will be located in relatively fast parts of the file storing memory and so that less frequently used ones of the files will be located in comparatively slower parts of the file storing memory. Such periodic tuning may help to improve the speed at which various programs appear to run.

Periodic file re-positioning comes with a price. The processes of: (a) determining which files should be moved; (b) determining where those files should be moved to, and (c) the actual moving of the files may consume so much machine time and/or bandwidth that the end-user may feel the benefit is not worth the pain. It is not unusual to see in the prior art, a "file defragmenting" and/or "file re-positioning" process which takes over full control of the computer and requires a significant amount of time to complete.

In view of the above, practitioners in the art of disk optimization are caught between competing desires. On one hand there is: (a) the desire to minimize tuning time, but on the other hand there is (b) the desire to place files efficiently according to their usage patterns. Practitioners face questions regarding: (1) how to determine which files are "most frequently" used, (2) what constitutes an accountable-for "use", (3) how can such usage and frequency information be gathered in an efficient manner, and (4) what is to be done with the information once it is collected?

Disclosed herein are methods and systems which may be used to automatically tune or optimize the placement of files in file-storing disks (or in other differential rate memory subsystems) while coping with the above posed difficulties.

BRIEF DESCRIPTION OF THE DRAWINGS

The below detailed description section makes reference to the accompanying drawings, in which:

FIG. 3A schematically illustrates how a file usage log may be maintained and used for periodic optimization of file placement within a differential rate memory subsystem such as one having a spinning magnetic disk in accordance to one embodiment.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
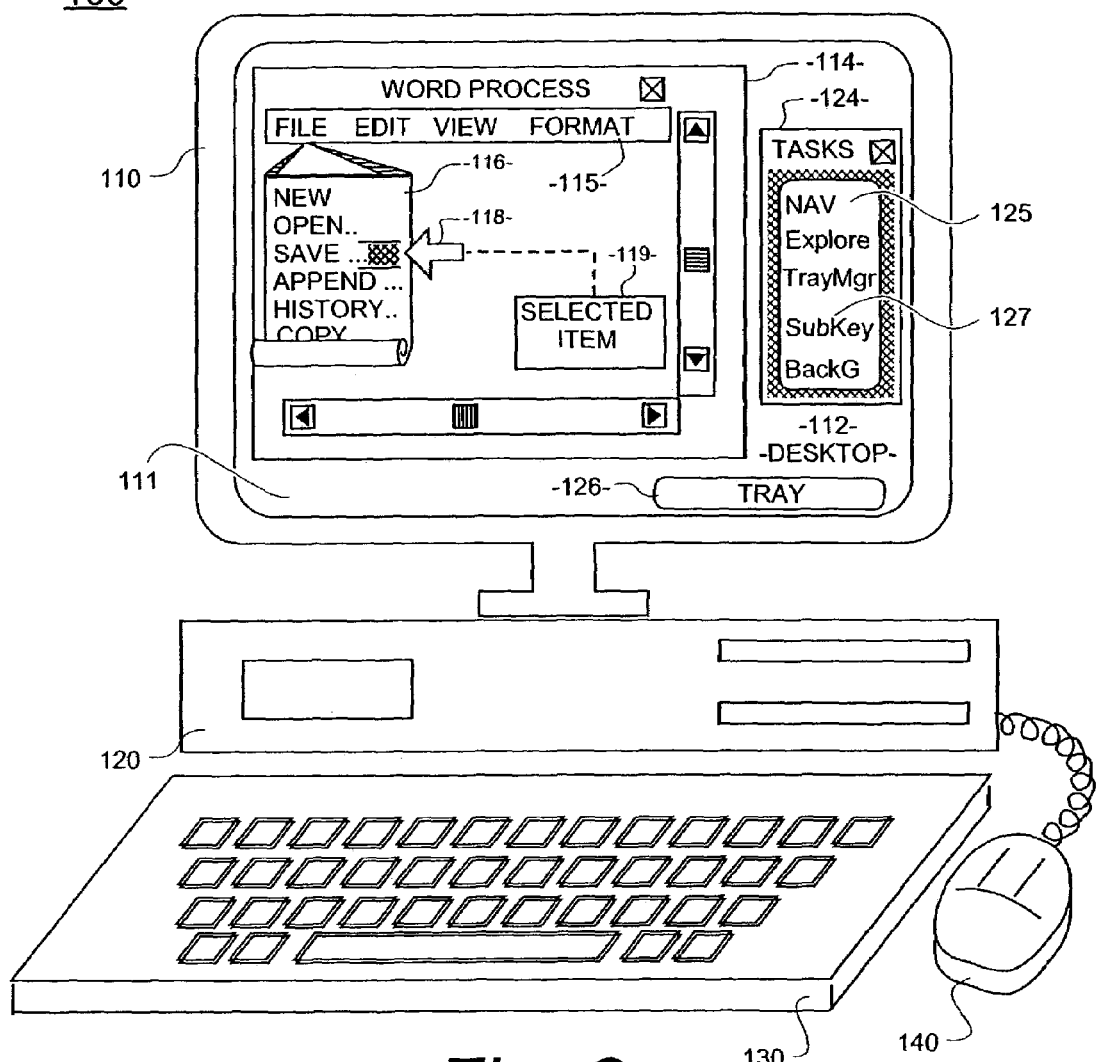
FIG. 1 is a perspective view showing a computer system that may be configured to operate in accordance to one embodiment.

FIG. 1 illustrates a perspective view of an overall computer system 100 that may be programmably configured to operate in accordance to one embodiment. This view will be used to explain in simple terms why sub-optimal file placement can slow down the apparent performance of an in-use application program.

The illustrated computer system includes a visual display means such as monitor 110, a computer housing 120, a keyboard 130 and a mouse 140. The illustrated user input and/or output devices 110, 130 and 140 are merely examples. Other to-user output devices and/or from-user input devices may, of course, be used in addition to or in place of the illustrated devices. Mouse 140 for example can be replaced by or supplemented with other graphically-oriented user input devices such as trackballs, touch pads, touch screens, joysticks, and so forth. Voice input and/or output interfaces are contemplated in addition to the illustrated visual and tactile interfaces.

The exemplary display monitor 110 includes a display screen 111 that is used for displaying a number of graphical items including a desktop layer 112 and a first overlying and opened application window 114. Reference numbers that are braced by dashes ("-nnn-") are not part of what is displayed on the screen 111. In the illustrated example, the opened application window 114 contains a running word processing program having the fictional name, WORD PROCESS. The actual word processing program could be Microsoft WORD™, or Corel WordPerfect™, or any one of a host of other commercially available or other word processing programs. In addition to, or in place of illustrated application window 114, the machine 100 could be multitasking through and running other foreground programs such as a spreadsheet program (e.g., Microsoft EXCEL™), a picture-drawing program, an Internet browser program (e.g., Microsoft Internet Explorer™), an electronic mailing program (e.g., Microsoft Outlook™), or any other such application programs of which the novice user is normally aware.

However, computer system 100 may simultaneously be multitasking through many background programs of which the novice user is normally not aware. In FIG. 1 we hypothesize that the user has caused a tasks-displaying, second window 125 to pop up onto the displayed desktop 112 by hitting a hot-key combination such as ALT-CTRL-DEL (which combination is often used in the MS Windows Operating System. The tasks-displaying window 125 allows us to see some of the background tasks that are currently running on the machine. One of the illustrated background programs is Norton Anti-Virus™ (NAV, available from Symantec Corp. of California). The NAV routine 125 may have been configured to persistently step through system files and check them in the background for the presence of virus signatures or other potentially undesirable content. Such a NAV routine 125 (or another anti-virus program) may be consistently using a signatures profiling file (not shown) and/or other on-disk files to perform its functions. As a result, a disk-reading head 172 (FIG. 2) may be periodically seeking the signatures profiling file (not shown) to read it's the data. The user is typically not aware of such background activity. But if the background disk-reading activity consumes a relatively large amount of time, the user may notice an undesirable slow down in the performance of his or her foreground program 114.

Other examples of background tasks could include the illustrated Tray-Managing routine (for managing a desktop tray 126 of available services), a SubKey routine 127 or other generic-types of background routines, BackG. The SubKey routine 127 may be responsible for testing keyboard events (e.g., key hits) for the presence of special key stroke combinations that are to provide substitute characters (or other responses) in place of the normal responses established by the OS. An example is if the typist is using a foreign language that calls for unique characters, punctuations, and so forth. To perform its functions, the SubKey routine 127 may need to refer to a substitutions lookup file (not shown) and/or other on-disk files in response to each key stroke that is entered for the foreground program 114. As a result, the disk-reading head 172 (FIG. 2) may be seeking the substitutions lookup file (not shown) to read it's data on a fairly periodic basis.

The novice user is typically not aware of this and other background activities. However, if the accumulation of background disk-reading activities by routines such as 125 and 127 consumes a relatively large amount of time, the user may perceive an undesirable degradation in the performance of his or her foreground program 114. As such, it may be desirable to activate a disk-optimizing program which determines which files are most frequently used and to defragment and place those files in regions of the system disk that are most quickly accessible. Of course, the problem is, as explained above, to decide how exactly a disk-optimizing program or, more broadly speaking, an optimizer for a differential rate memory subsystem, is to go about analyzing and determining which files are "most frequently" used and to define what the optimizer does with such analysis information.

Before getting to various solutions that are provided in accordance with the present disclosure, we detail a few more items of noteworthy interest in FIG. 1. The foreground application window 114 may contain a top menu bar (application bar) 115 having menu-dropping areas such as FILE, EDIT, VIEW, FORMAT, etc. A user-movable cursor 118 may be displayed on screen 111 in the form of an arrowhead or otherwise and may be made movable over the other displayed items in response to user activation of the mouse 140 or of another such input device. The arrowhead shaped cursor 118 is shown in FIG. 1 in a state after which a given item 119 within program window 114 has been selected (clicked on), and the cursor has thereafter been brought over the FILE portion of the top menu bar 115. Following this, the left mouse button was clicked and this caused a pop-down menu 116 to unscroll from the activated FILE region.

The unscrolled pop-down menu 116 lists a number of tasks (functions) that may be performed by the illustrated application program with respect to its FILE management category of tasks. These exemplary tasks include: (1) OPEN, which task tries to obtain a 'handle' from the OS for referring to a file that may later be read from or written to; (2) SAVE (or SAVE AS), which task may try to save data to the currently opened file or to another, to-be-identified file where the to-be-saved data may be either the selected item 119 or the full work product in the window 114; (3) APPEND, which task may try to attach to the end of the currently opened file or as an appendage to another, to-be-identified file the selected item 119; and (4) HISTORY . . . , where the latter choice-item may unfurl a second menu (not shown) that lists a history of FILE management functions previously performed. Another illustrated, and simple FILE or EDIT function is COPY (partly shown), which task allows the user to copy the selected item 119 to a clipboard area (not shown). The so-copied item may then be PASTEd into a different file or into the same file at a location chosen by the user. As understood by experienced users, many of these FILE-directed functions allow a user to save work-in-progress to a nonvolatile storage means such as to a local magnetic/optical hard disk or to a networked file server or to other such work-preserving means. Besides the foreground-invoked functions, many applications (e.g., 114) may have automatic background functions that periodically save workproduct to one or more backup files so as to protect the user from inadvertent loss of work.

Given the wide variety of foreground and background activities that may occur for a given user, or a given computer site, it is often the case that some files are read from, or written to, or appended to, or prefixed with new data far more often (over the long haul) and/or to a greater extent than are other files. It would be advantageous to accurately identify such files and to strategically place them in appropriate regions of the work-preserving, storage subsystem so that the strategic placements operate to minimize file utilization time over the long haul, to minimize file fragmentation tendencies, and to thereby make optimal use of the computer's limited (finite) bandwidth.

Although not further shown in FIG. 1, it should be understood by users of conventional GUI's (Graphical User Interfaces) that another pop-down menu like 116 may be unfurled from the EDIT area of menu bar 115 to reveal data-manipulating functions such as COPY, CUT, PASTE, etc., which functions allow a user to save work-in-progress to a clipboard storage area and to later move the clipboard contents to a local magnetic and/or optical storage disk or to a networked file server or to other such work-preserving means. There are often a number of keyboard stroke combinations (e.g., CTRL-C, CTRL-X, CTRL-V) that allow users to do the same thing without menus. Some applications may periodically backup the clipboard contents into a series of backup files so that the user can retrieve and restore CUT workproduct long after it is cut or deleted from the foreground window 114. Such clipboard backup files may change in size and content on a relatively frequent basis. Frequently-resized files are different in nature than frequently-utilized, but not re-sized files, as shall be seen below.

There are times when a user is trying to perform an input operation in the foreground and suddenly the user's ability to type new text into window 114 or to add other input is frozen out for a discernable duration because a background task (e.g., a file backup) is taking place and the background task is consuming too much system bandwidth (it is taking too long to complete). The user may become momentarily alarmed by the thought that application program 114 may have become 'frozen' or 'crashed'. It is desirable to avoid too many of such alarming incidents. One way to do this is to periodically relocate files (e.g., every few hours or days) to optimal positions based on their frequency of use.

Various techniques have been proposed for trying to automatically determine which files are "most frequently" used and to automatically determine where on the system hard disk such files should be placed. Unfortunately, specific ones of the proposed techniques do not live up to ordinary expectations of what constitutes "most frequently" used, and they do not strategically place files according to what would benefit the end-user in the long run; especially if the benefit analysis considers the machine time that is lost for carrying out the disk optimization.

One of the reasons that prior optimization techniques do not work well is because they have generally defined "most frequently used" on the basis of a one-time snapshot of the file system state. Many operating systems do not maintain a file usage log that details how often per hour, per day, or per week, and so forth, a given file is used. Instead they keep track of information which is of limited usefulness to disk optimization. The more common forms of OS-kept information; such as, (1) Date and Time of first Creation of each file, (2) Date and Time of Last Modification of each file, (3) Date and Time of Last Access to each file, and (4) Current Number of data bytes in each file do not accurately indicate how often a file is "utilized" in a manner that relates to its position in a differential rate memory subsystem. For example, the OS will typically consider and therefore record the Time of Last Access to cover "all" file-identifying operations, including the file OPEN and file CLOSE operations. However, for purposes of disk optimization these statistics can be deceiving and can produce poorer performance rather than enhanced performance. One should be clear about the difference between actual file "utilization" and mere attempts to reference a file. One should also understand the difference between a one-sample-point snapshot of file-usage history and a more scientific approach to gathering information about long-term statistics concerning file utilization.

By way of example, assume there are two files named Often-Used.DAT and Thrice-only.TXT. Assume that just before a disk optimization operation is executed, where the optimization occurs at an arbitrarily selected time, the Thrice-only.TXT file (not shown) had just been CLOSEd, even though it had not even been read from, or written to, during the latest usage session. Nonetheless, assume the OS recorded the Thrice-only.TXT file as having been recently-'accessed', as the term is used in its broad sense. The Thrice-only.TXT file has in fact been so 'accessed' only three times: once when it was created five years ago, and just now because a user inadvertently caused his program to OPEN it but not to even read from it, and to later merely CLOSE it. Assume further that at the randomly selected time (e.g., midnight) of our hypothetical disk optimization, our Often-Used.DAT file had not been used for 5 hours even though, since its creation about a year ago, it has been generally "utilized" (this including modification of its data) hundreds of times each day during normal working hours (e.g., 9 am–5 pm).

Based on the OS-kept statistics describe above (e.g., Last-Accessed, First-Created, etc.), the hypothetical disk optimization program may wrongly classify the Thrice-only.TXT file as being "heavily used" and it may at the same time classify the Often-Used.DAT file as being "rarely used". The hypothetical disk optimization program may then imprudently place the Thrice-only.TXT file in a high-speed, outer track of the system disk and it may inefficiently relegate the Often-Used.DAT file to a slower inner track of the system disk. It should be clear from the above example that use of imprecise definitions regarding what a file 'use' is, and reliance on one-time snapshot statistics can fool a disk optimization program into making imprudent and even harmful decisions.

Continuing with our hypothetical example, assume that the disk optimization program instead relies on the OS's "Last-Modified" statistics. It may then place our Often-Used.DAT file in a high-speed, outer track of the system disk. But is that really the best place for such a file? We will show below that sometimes it is not. The OS's Last-Modified statistics may not provide enough information for determining where a frequently-written-to file should be best placed. An improved statistics-gathering method would gather and provide information that is specifically useful for purposes of disk optimization; or more generically speaking for purposes of optimized file placement in a differential rate memory subsystem.

Figure 2:
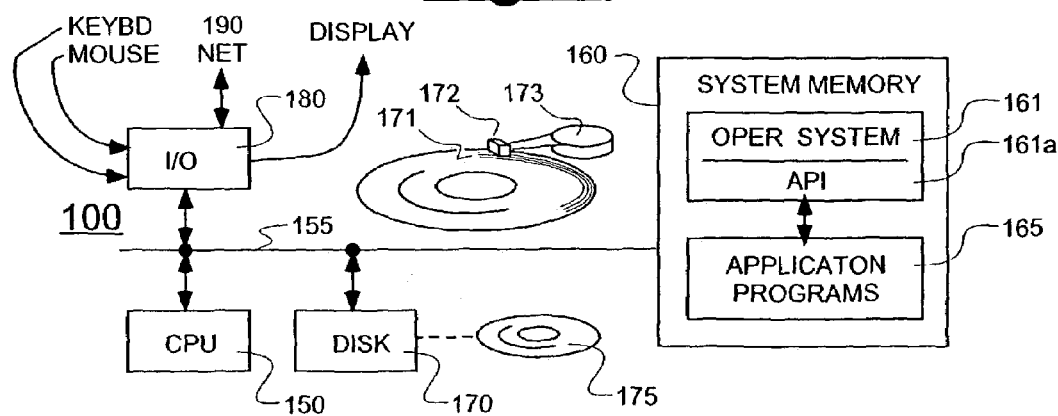
FIG. 2 is a block diagram of a computer system that may be configured to operate in accordance to one embodiment.

Before explaining in more detail though, we first refer to FIG. 2 and illustrate a possible method for interconnecting components of a computer (e.g., 100 or of another form of instructable machine) that may be used in accordance to one embodiment. Computer 100 may include a central processing unit (CPU) 150 or other data processing means (e.g., plural processors), and a system memory 160 for storing immediately-executable instructions and immediately-accessible data for the CPU 150 or other processors. System memory 160 typically takes the form of DRAM (dynamic random access memory) and cache SRAM (static random access memory). Other forms of such high-speed memory may also be used. A system bus 155 may operatively interconnect the CPU 150 and system memory 160.

Computer system 100 may further include non-volatile mass storage means 170 such as a magnetic hard disk drive, a floppy drive, a CD-ROM drive, a re-writable optical drive, or a like other drive 170 that is operatively coupled to the system bus 155 for transferring instructions and/or data over bus 155. Instructions for execution by the CPU 150 may be introduced into system 100 by way of computer-readable media 175 such as a floppy diskette or a CD-ROM (or a DVD-type), an optical platter or other like, instructing devices adapted for operatively coupling to, and providing instructions and data for the CPU 150 (or another form of instructable machine). The computer-readable media 175, whether fixed in place or portable, may define a device for coupling to, and causing system 100 to perform operations in accordance with the present disclosure as further described herein.

A common characteristic of the file-storing, mass storage means 170/175 of many computers is that file read and/or write times may vary significantly depending on where physically within the file-storing, mass storage means 170/175 a given file is located or spread. This differential rate of read and/or write times is most often seen in rotating media (or rotating head) drives where outer tracks (or cylinders) exhibit greater rates of bits read or bits written per second than do inner tracks (or cylinders). One reason for this can be that the arc lengths of the outer disk regions are longer (and thus they can hold more data). Another reason can be that the circumferential speeds of the outer disk regions are greater than those of inner regions. Although differential rate of read and/or write times is often associated with magnetic and or optical disks and the like, it is within the contemplation of the present disclosure to apply the principles presented herein to other forms of differential rate memory subsystems where the reason for differential rate access is not limited to that of rotating media. Although some of these alternate or supplemental subsystems may not have rotating mechanical parts, these other forms of mass storage may still exhibit differential rates of read and/or write times due to addressing latencies, due to delays over data-transmitting channels, or due to other factors which may create a dependency between file location and effective read/write data rates.

As shown in FIG. 2, conventional rotating storage media (e.g., hard disks) typically have a rotary actuator 173 with an arm extending therefrom to support a distal read/write head 172 over concentric or spiral data tracks 171 of the rotating storage media (e.g., a magnetic disk). During typical use, the read/write head 172 tends to remain positioned over the outer tracks because OS-critical files such as the roots of the system FAT (File Allocation Table) and/or of the MFT (Master File Table) are often positioned at such outer tracks as may be other frequently-used OS data structures. Given this, it is desirable to place the most frequently read (but not the most frequently-resized) ones of user and application files near the outer circumference because such placement tends to minimize track-seeking time, and to maximize data reading rates, and to thereby minimize operation time for the most frequently executed routines that frequently utilize such files.

It is known that over time, files which are frequently written to, and which grow in size as a result; tend to break up and become distributed as file fragments across the surface area of the disk. Track seeking time then increases and performance may suffer due to the fragmentation. It becomes advantageous to periodically defragment the disk and strategically place the defragmented files or contiguous parts thereof so that the time for successive sector reads and track seeks is minimized. The algorithm disclosed in the above-cited, U.S. Pat. No. 5,802,593 of Grimsrud may be employed for example to minimize the time for successive sector reads and/or sector writes. Note that not all files which are written to on a frequent basis change in size as a consequence of the frequent writings. A fixed-size, system 'swap' file (one that acts as a virtual extension of system memory 160) is an example of a special purpose file whose size generally does not change even though it may be used on a very frequent basis. More on this later.

Continuing with our overview of a possible interconnection for system 100, an input/output (I/O) means 180 may be further included for providing interfacing between system bus 155 and peripheral devices such as display 110, keyboard 130 and mouse 140. The I/O means 180 may further provide interfacing to a communications network 190 such as an Ethernet network, a SCSI network, a USB network, a telephone network, a cable system, an optical fiber network, a WiFi network, or the like. Instructions for execution by the CPU 150 may be introduced into system 100 by way of data signals transferred over communications network 190. Communications network 190 may therefore define a means for coupling to, and causing system 100 to perform operations in accordance with the present disclosure. The instructing signals that are transferred through the communications network 190 for causing system 100 to perform said operations may also be manufactured in accordance with the present disclosure.

System memory 160 typically holds executing portions 161 of the operating system (OS) and of any then-executing parts of application programs 165. Some of the data of system memory 160 may be routinely swapped into and out of one or more, on-disk swap files (not explicitly shown). Counterposingly, part of system memory 160 may implement an in-RAM virtual disk (RAM disk) that contains a selected few files. The application programs 165 generally communicate with the operating system by way of an API (application program interface) 161a. System memory 160 alone or in combination with drive/media 170/175 and/or I/O interface 180 and/or network connection 190 may include means for causing system 100 to perform various operations in accordance with the present disclosure.

With modern operating systems (OS's), the OS often temporarily stores in its higher speed memory resources, executable or other software objects that are newly created, or currently "open" and which are immediately executable or are otherwise to be quickly accessible to the CPU 150. Although not specifically shown in FIG. 2, allocatable storage space such as "free" parts of system memory 160 or "free" parts of disk 170/175 can be dynamically allocated for storing newly-created data objects. The so-allocated memory space and/or other system resources may be later de-allocated when the corresponding objects are closed, deleted or otherwise disposed of. De-allocated memory space or disk space can then be overwritten with new information as demanded by system operations and actions of third party application programs. Given this dynamic, on-the-fly allocation of storage space, it is advantageous to define a so-called, on-disk free space or on-disk free pool and to grow the more volatile data structures (those that are created and destroyed most frequently) into the beach head of the free pool.

FIG. 3A illustrates a storage optimizing system 300 that may be operated in accordance to one embodiment. Part 370 represents a rate differential memory subsystem which may be constituted by a rotating magnetic disk or the like. Uppermost section 371a represents the fastest data rate portion of part 370 while the lowest illustrated section 376b represents the slowest data rate portion. The read and write data rates of the sections illustrated in between top portion 371a and bottom portion 376b are understood to be of intermediate and successively decreasing rates moving from top to bottom. The illustrated distribution is not to scale.

In the case where memory part 370 constitutes a magnetic disk or platter, section 371a typically represents the outermost and fastest data tracks (or cylinders) while bottom section 376b typically represents the innermost and therefore slowest data tracks (or cylinders). The operating system usually maintains at least one free space 375 somewhere between top and bottom portions 371a–376b. Clusters or other storage allocation units are consumed from the beachhead 375a of the free space and inwardly towards the back wall 375b of the free pool as the OS creates new files or extends the size of pre-existing files. The allocation units of temporary files are returned to being considered as part of free space 375 when those temporary files are deleted. Although shown as contiguous, the free space 375 may become fragmented with passage of time just as initially contiguous files can become fragmented. During defragmentation, spaced-apart pieces of the free space 375 should be re-coagulated into a contiguous whole.

Given these characteristics of the free space 375, it is desirable to locate those files which are most frequently utilized and at the same time most frequently re-sized, close to the beachhead 375a of the free space so that track-seeking distance between the head portion (H) of such highly volatile files and the frequently growing and/or frequently shrinking tails (T) of such volatile files 378 is minimized.

By contrast, those files which are most frequently utilized but remain of fixed size or essentially fixed size in terms of the number of storage allocation units they consume are preferably placed in the fastest region 371, with the extremely most frequently utilized of these files being positioned closer to top edge 371a. An example of such a frequently utilized but essentially non-volatile files is the system swap file 379. Although the internal contents of swap file 379 change quite often as data is swapped back and forth between system DRAM and disk, the storage allocation units which are assigned for the swap file 379 remain essentially fixed. Thus the swap file 379 may be considered to be non-volatile because the number of clusters or other allocation units that it consumes does not generally change over time.

Another example of a file that may be considered as inherently, being frequently utilized but nonvolatile in size is the snap-shot version, 305N of the file-usage log (305).

Typically, the most current version 305 of the file-usage log will be kept in system memory (160), given that the current version 305 is usually being constantly changed as file-utilization data is being gathered. Periodically, however, a nonvolatile snapshot copy 305N of the current file-usage log (305) will be stored into memory part 370 so that the statistical data captured by the current file-usage log (305) will not be lost when power is shut off and the system memory (160), if it is of the volatile type, loses its contents. Depending on the snapshot-making periodicity selected by the system administrator, the nonvolatile snapshot copy 305N of the current file-usage log may be deemed as being automatically of the Frequently Utilized and Essentially NonVolatile type and it may be automatically slated for placement in fastest region 371 as shall be elaborated on below.

Those files which are most-infrequently utilized and are essentially non-volatile are preferably placed in the slowest disk region 376, below the fixed back wall 375b of the free space. It is assumed here that the free space 375 grows and shrinks only at its top beachhead 375a. Of course, if the operating system shrinks and grows its free space from both sides, it may be desirable to alter the illustrated arrangement and have the frequently re-sized files (e.g., 378) sandwiched about the two active beachheads (not shown) of such an alternate free space organization. Furthermore, if the OS maintains more than one band of free space 375, those files which are classified as being the most frequently re-sized (e.g., 378) may be placed accordingly near the active beachheads of such multiple free space bands; in compliance with the present teachings.

Between the essentially fixed-size files of fast region 371 and the highly volatile files of beach front region 374, additional regions such as 372 and 373 may be established for respectively storing those files that are utilized with moderate frequency and are substantially non-volatile and those files which are re-sized on a moderate-to-infrequent basis. Border 372b between regions 372 and 373 is, of course, that area where the frequency and/or extent of file re-sizing blends from being considered infrequently re-sized to being considered substantially non-volatile.

The lower part of FIG. 3A schematically shows various kinds of usages (e.g., daily, monthly, etc.) that may interface with media section 370. Boundary 303 illustrates a logical separation between two kinds of access operations that tend to occur at different rates of regularity. Log-maintaining activities 301 tend to occur on a daily basis or a like period of regular use. On the other hand, file-optimization activities 302 tend to occur weekly, monthly, or at other such longer periods which are relatively greater than the regular period of the log-maintaining activities 301. Although we at times refer herein to the regular-use period as "daily" and to the optimization period as "weekly" or "monthly", it is within the contemplation of this disclosure that other durations may be used for the regular-use periods and the optimization periods as may fit a given set of particular circumstances. For example, in a heavily used network server it may be more appropriate to define the periodicity for gathering statistics on regular-use as "hourly" and to define the periodicity for carrying out optimization analysis and file reorganizing operations as "nightly". Contrastingly, in a very infrequently used accounting system, the regular-use period may be defined as "weekly" and the normal optimization period may be defined as "bimonthly". The absolute values of the regular-use period and the normal optimization period may be user configured ones which are left to the end-user and/or system administrator to determine based on their specific needs.

Referring to the regular (daily)-use side 301 at the bottom left portion of FIG. 3A, it is seen that various programs call upon the API of the operating system (OS) for performing file access operations. The API calling step is represented by box 310 and the transfer of the request data to the API 312 is represented by signaling path 310a. However, as further shown in FIG. 3A, the signaling path 310a is interrupted by a pre-execution interceptor 311 that is structured in accordance with the disclosure. In one embodiment, the intercept occurs for every file access request made to the OS. In another embodiment, the intercepting occurs on a statistically uniform sampling basis, i.e. a pseudo-randomized picking of say every 10th+R request where R is a random number in a predefined range, say −4 to +4 for example. Interceptor 311 analyzes the intercepted parameters 310a that are being passed to the API 312 and determines whether the API call 310 will be trying to "utilize" its targeted file in a manner where placement of the targeted file is likely to affect the duration of performance of the API function/service or not. As already explained, operations such as file OPEN and file CLOSE generally occur without actually reading from the sectors, clusters or other such physical portions of the targeted file (the file to be OPENed or CLOSEd). Thus such activities may be categorized as not being a direct utilization of the identified file. On the other hand, operations such as file READ, file COPY, and file WRITE generally do cause the data reading head (172, FIG. 2) or its equivalent to actually seek out the physical storage component that holds the data of the identified file. And such therefor constitutes a direct "utilization" of the targeted file (or files, in the case of a multi-file operation such as COPY).

Analysis results 311a of the pre-execution interceptor are recorded into a current file-usage log 305. From time to time, a snapshot copy of the current file-usage log 305 is made to a nonvolatile backup location such as 305N. The periodicity of the snapshot taking depends on context. In heavily used servers, the period may be fairly short (i.e. every minute) while in lightly-used client workstations, the period may be, say only once an hour. Although the illustrated example prospectively determines at a pre-execution time whether there will be a utilization of the correspondingly referenced file, it is within the contemplation of the disclosure to instead retrospectively determine, at a post-execution time, whether there was a utilization of the correspondingly referenced file and to record the increase of utilization at that post-utilization time.

After the illustrated pre-EXEC intercept (311) occurs, the original signals 310a of the API call are passed on as post-interception signals 310b to the API 312 for execution. Typically, the pre-EXEC intercept 311 is transparent and neither the API 312 nor the calling program 310 is aware that the pre-EXEC intercept occurred.

In some instances, results obtained from the pre-execution interceptor 311 may be used for automatically determining whether a post-execution intercept 313 is also desirable or not. This decision (see step 345 of FIG. 3B as an example) may be signaled by way of path 314. If a post-EXEC intercept 313 is not requested, the API result signals 312b are returned directly back to the calling program 310 and the latter application program proceeds without necessarily knowing that the pre-EXEC intercept 311 occurred. If the post-EXEC intercept 313 does occur, the return signals 312b from the API routine 312 are examined and further modifications to the current file-usage log 305 may be made by way of paths 314 and 311a to reflect in the log 305, relevant determinations made by the post-EXEC intercept 313 about the size-volatility and/or utilization of the referenced file. Thereafter, the API return signals are allowed to continue by way of path 310c to the calling program. The calling program is usually left unaware of the post-EXEC intercept 313.

When the occasional (e.g., weekly) optimization operations 302 occur (e.g., due to scheduled tasking or arbitrary user choice), a file defragmenter and/or content placer (defragger/placer) 320 is activated. File defragmentation and/or relocation may occur at this time in accordance with any of a wide variety of known techniques including that disclosed in the above-cited U.S. Pat. No. 5,778,392 to Stockman et al. The defragmenting and/or relocating algorithm, if used, should allow the defragger/placer unit 320 to control to at least some extent, the location of the files or file portions that it will defragment and/or it will place on storage media 370. The defragmenting and/or relocating algorithm may also allow the defragger/placer unit 320 to control to at least some extent, the location(s) and/or continuity extent(s) of one or more free spaces created on the storage media 370; where each such free space (only one shown at 375) defines a region that is essentially free of data belonging to undeleted files. Data flow path 338 represents such a control over the location(s) and/or continuity extent(s) of the one or more free spaces (e.g., 375).

In making its automated placement decisions, the defragger/placer 320 consults (321) with a file classifier 322. The file classifier 322 classifies various ones of the files that are selected for defragmenting and/or changed-placement as belonging to one of approximately six groups, denoted here as categories A, B, C, D, E and F. (These category letters are encapsulated in circles in FIG. 3A. In other embodiments there can be a larger or smaller number of categories and/or there can be a greater number of free spaces about which the categorized files are placed.)

As seen in FIG. 3A, the Category-{A} files are preferably placed in a relatively fastest-access section 371, while Category-{E} files are preferably placed in a free-space beachfront section 374, Category-{F} files are preferably placed in a free-space bleachers section 376; and category {B}, {C} and {D} files are respectively placed across sections 372–373 in the order shown. To determine which file belongs in which category, the classifier 322 consults (where the consultation is constituted by information gathering action 325) the current file-usage log 305 that had been maintained by the regular (e.g., daily) use activities 301. In another embodiment, the classifier 322 may alternatively or additionally consult one or more, older, snapshot versions (only one shown at 305N) of the file-usage log.

A legend 330 is provided above classified placement actions 331–336 to indicate what set of categorizing parameters may be used for making classification decisions in accordance with one or more aspects of the disclosure. One of the categorizing parameters, R/W?, indicates or provides a measure of how often and how recently the file has been directly utilized, such as for reading or writing. Another parameter, ReSized?, indicates if and/or provides a measure of an extent to which the number of storage allocation units assigned to the file has fluctuated. These parameters are crudely summarized in FIG. 3A so that it may be seen that a Category-{A} file is one that has been found to have been heavily utilized in recent times (in a predefined, "Recent" time frame) but has essentially not had any significant change in the number of storage allocation units (e.g., clusters) assigned to it. (Although FIG. 3A shows the broader definition of "frequently accessed", the here-preferred rule of discrimination is nonetheless, "frequently utilized" rather than merely, frequently-accessed. It is possible however to use the less discriminating approach of measuring which files are more frequently-accessed while still comporting with other parts of the present disclosure, for example, also keeping track of file-size volatility.) If a file is classified in Category-{A}, then placement activity 331 tries to responsively position that Category-{A} file in the comparatively fastest section, 371 of the storage media 370. A failure to successfully place a given, Category-{A} file wholly or partially in the comparatively fastest region, 371 does not necessarily result in any sort of operational failure. A Category-{A} file may be placed in another region and its contents will still be accessible. Placement of such a Category-{A} file in the different region may merely result in less efficient usage of the differential rate memory subsystem 370.

Further in accordance with one aspect of the present disclosure, a Category-{B} file is one that is determined (e.g., through use of statistics gathered in log 305) to have been utilized on a moderate basis but has had substantially no change to the number of storage allocation units assigned to it. Placement action 332 tries to place such Category-{B} files in a moderately-fast (but not fastest) section 372 of the storage media. Once again, although FIG. 3A shows the broader definition of "middlingly accessed", the here-preferred rule of discrimination is nonetheless, "moderately utilized". It is possible however to use the less discriminating approach while still complying with the spirit of the present disclosure.

In similar vein, a Category-{C} file is one which is automatically or otherwise determined to have not been substantially utilized for quite a bit of time (not since the "Old" time frame) but which is observed to have had a moderate amount of re-sizing (/Yes) when it was last used. Placing activity 333 tries to position such Category-{C} files in band 373c of section 373, where the placement extends away from boundary 372b depending on aging since last use and on volatility. In line with this approach, the Category-{D} files are those which were determined to have middlingly amounts of utilization during a middle portion of the time span being logged (by log 305) and were observed to have experienced a comparatively moderate amount of re-sizing when so accessed. Placing action 334 tries to place such Category-{D} files in a "beachfront-overlooking" section 373d as shown. The "beachfront-overlooking" real estate is just behind a true beachfront region, 374; where the waves of the free space 375 lap in and out over wading tails (T) of volatile files such as the one represented by box 378.

Category-{E} files are classified as those which are automatically observed to have been heavily or moderately utilized very recently and to have had substantial amounts of re-sizing due to such recent activity. Placement activity 335 tries to position (place) such Category-{E} files in beachfront section 374 of the storage media 370 with the most volatile files (e.g., 378) bordering or extending across the current free-pool line 375a.

Category-{F} files are those which are automatically deemed by the system to have not been utilized for a comparatively longest amount of time (e.g., not since a predefined, "Ancient" time frame) and have not been re-sized to any substantial degree when they were so accessed. If the usage for a given file is not recorded in file usage log 305, it may be automatically assumed by the system (300) that the given file is very old and very non-volatile and therefore also belongs in Category-{F}, near end wall 376b. Placement activity 336 therefor tries to position all such Category-{F} files in section 376 of the storage media near the slowest, bottom border 376*b*. In some instances, a newly-created or newly-acquired file may have mock statistics generated for it in the log 305 so that a soon-following defrag and/or re-placement operation does not prematurely move that new file into the relatively-inactive region 376. If a given file is inappropriately placed by one mechanism or another in one of regions {A}–{F}; where the inappropriateness is evidenced by subsequent utilization patterns, then subsequent file-uitlization loggings and file-repositionings will work toward shifting the given file towards its more appropriate position.

Figure 3B:
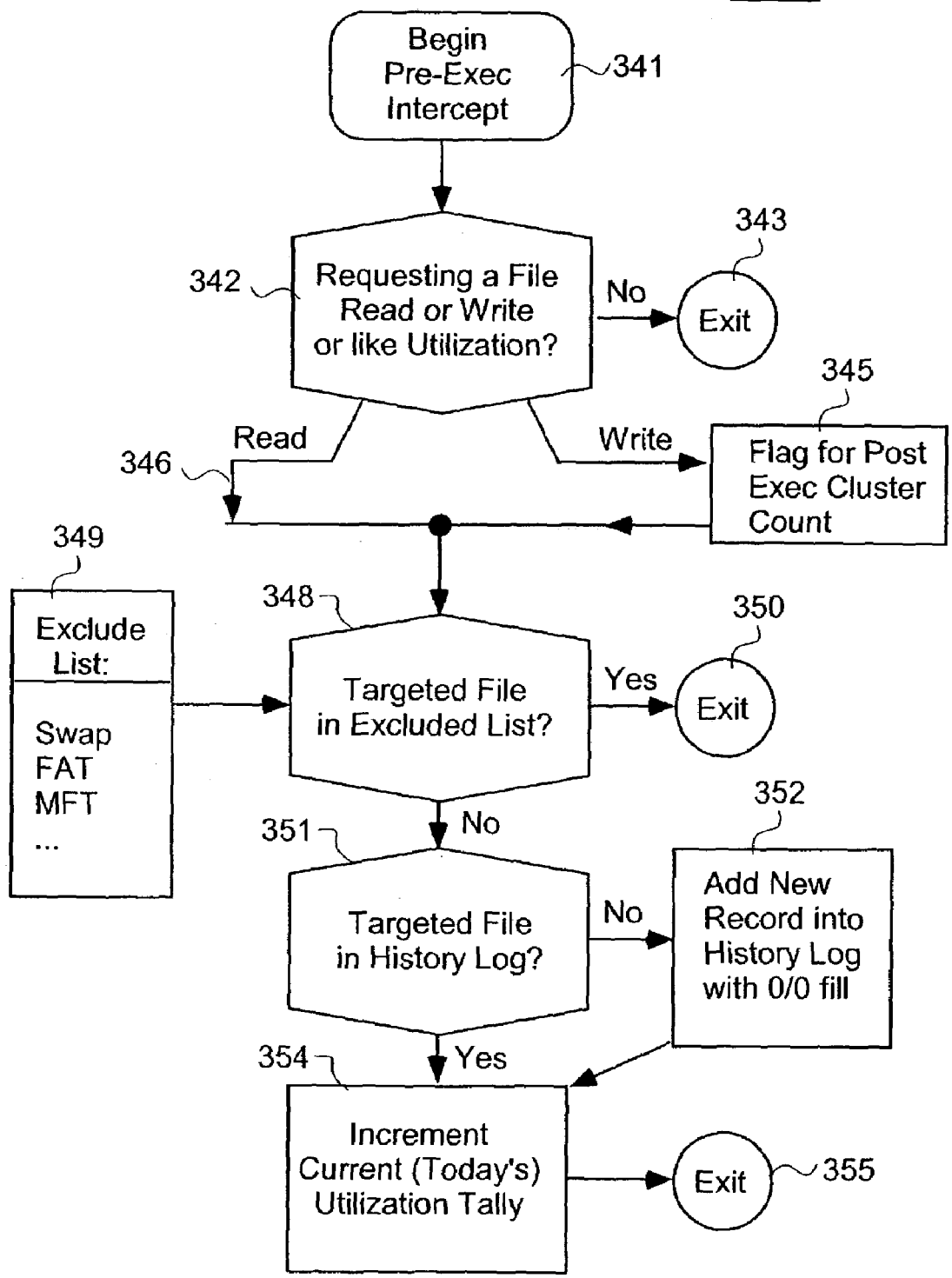
FIG. 3B is a flow chart of a pre-execution intercept algorithm in accordance with one embodiment that keeps track of rate-dependent and placement-dependent utilizations of files in accordance to one embodiment.

Referring to FIG. 3B, a flow chart is provided for schematically illustrating one embodiment 311' of a machine-implemented pre-execution interception method. At step 341, a file-accessing call to the operating system API is intercepted. At test step 342 it is automatically determined whether the requested file access is for a direct "utilization" of the targeted file contents as opposed to an access that does not actually read or write data from the storage allocation units of that identified file. If the accessing call is found to be merely making an indirect reference to the targeted file, such as is the case with a file OPEN or a file CLOSE request, then the intercept is immediately terminated through exit step 343 and the intercepted call is allowed to proceed without further interference by the utilization-logging mechanism 311'. This works to minimize the delay on intercepted API calls that are not going to be directly reading from or writing to storage allocation units of the respectively targeted file.

If test step 342 determines that data is going to be written to the identified file, control passes to step 345 where a flag is raised for carrying out a post-execution cluster count operation. If data is merely going to be read from the identified file (in other words, file-size will definitely not change), then bypass path 346 is taken to next step 348.

There may be certain types of special-use files which, because of their pre-defined nature, are a kind that should be excluded from having their read/write histories logged and/or their placements later changed. One reason may be because it can be safely assumed that the special-use files will inherently will be utilized with extreme frequency and/or volatility and will thus be specially placed or otherwise handled by the disk optimization process in accordance with those special uses. A files, and/or file-types, exclusion list 349 may be consulted by step 348 to determine if the currently targeted file is such a special-use file. Examples of special-use files include the system swap file (379), the file allocation table (FAT), the master file table (MFT), a file-usage log snapshot file 305N, and other such files. If the targeted file name and/or type is indicated by (e.g., listed in) the exclusion list as being an excluded file/type, then exit step 350 is quickly taken to thereby bypass further record updating step (s, such as those illustrated at 351, 352, 354) and thus minimize the impact of the intercept on such file accessing references to logging-excluded files or file types. Although FIG. 3B shows the update exclusion step 348 as occurring fully after R/W-determining step 342, it is within the contemplation of the disclosure to have the update exclusion operation occur fully or partially before step 342. For example, exclusion based on file type (e.g., based on the file name's extension: .TXT, .DAT, .CAB, etc.) may occur before step 342 while exclusion based on file name (e.g., IF Name=Temp*, then exclude) may occur after step 342.

If the requested file is not a specially excluded one, then in the next illustrated step, 351 it is determined whether statistics (e.g., log record) for the targeted file already exist in the file usage log. If the answer is NO, then in next step 352 a new record is created in the history log for the targeted file and that new record is filled with an appropriate history, typically, zeroes or equivalent indicators that it is a new record. In one embodiment, an option is provided for filling new records with "mock" histories that initially bias the file towards being classified in one of the placement categories such as {A}–{F} of FIG. 3A. The mock histories are slowly replaced by real histories as time goes on.

Step 354 may be entered into from either one of steps 351 and 352. In step 354, the current utilization tally (count) for the requested file under the current, regular-period tally (e.g., daily tally) is incremented. Exit 355 is then taken and control is passed to the operating system API for performing the requested file access function.

Various modifications can, of course, be made to the illustrated pre-EXEC algorithm 311'. For example, step 354 may alternatively or additionally maintain an hourly tally or a tally that is incremented in fractions of a day such as eight- or four-hour periods, as may be appropriate, for the usage of the computer system 100. The periodicity of the maintained tally or tallies in step 354 may alternatively be increased to cover plural days at a time if the computer system 100 is less frequently used. The specific interval of tallying may be determined empirically and manually set by the end user if desired. Alternatively the definition of the regular tally period may be fixed in the optimization process.

Another possible modification deals with the sets of files whose utilization histories are maintained and whose placement during memory optimization is based at least in part on the collected and recorded utilization histories. It is possible to define "groups" of files which are to be treated by the utilization history gathering mechanisms and the defragmentation/re-placement mechanisms as if each such group of plural files is a single file. For example, utilization and size-volatility history data may be kept collectively for a "folder" of files rather than for the individual files in that folder. Placement classification may be made for the folder-held files on the basis of the collective utilization and size-volatility history data of the folder rather than on the basis of utilization histories of the individual files. Thus, an infrequently-utilized file may be categorized for placement in fast-access region (e.g., {A} of FIG. 3A) if that infrequently-utilized file happens to belong to a tracked folder whose collective utilization history shows the folder contents as being frequently-utilized. There can be advantages and disadvantages to such group-based logging and placing of files. One advantage is that the history log may be made comparatively smaller. Another advantage is that folder-related files may be kept closer to one another for thereby improving performance during folder-COPY or folder-BACKUP operations.

Referring back to items 311 and 313 of FIG. 3A, it may be noted that some API calls may exist (e.g., APPEND) for which it may be possible to predetermine or approximate the re-size amount that will occur as a result of the API function being actually carried out before the request is executed (in step 312). In such predeterminable-size cases, the post-EXEC intercept may be dispensed with and volatility information in the file usage log (see FIG. 4) may be appropriately updated (see step 366 of FIG. 3C) during the pre-EXEC intercept. If the resize amount cannot be predetermined or guessed at within an acceptable error tolerance (system defined), then the resize amount may have to be determined after the API function being actually carried out (in step 312).

Figure 3C:
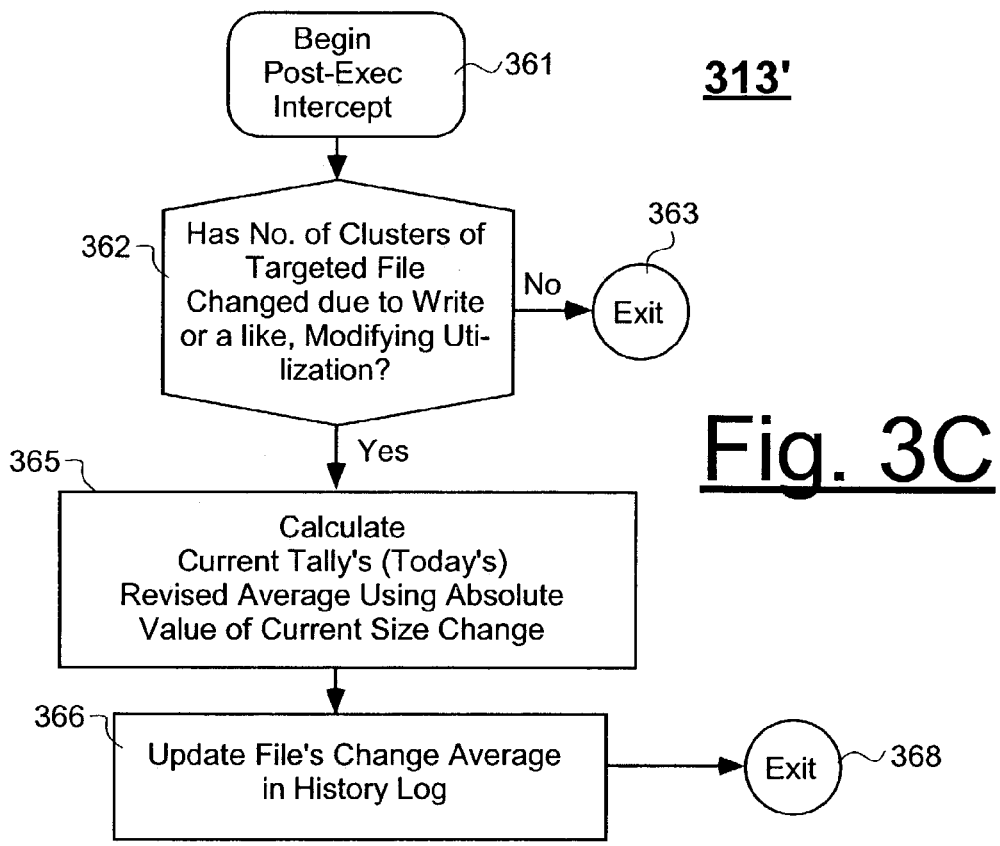
FIG. 3C is a flow chart of a post-execution intercept algorithm in accordance with the disclosure that keeps track of changes in the number of storage units consumed by modified files in accordance to one embodiment.

FIG. 3C shows an example of a post-EXEC intercept algorithm 313' in accordance to one embodiment. At step 361, the API function call is returning with its results. The results should indicate whether the number of clusters consumed or the number of other storage allocation units consumed by the requested file accessing action have changed due to the WRITE or a like file-modifying utilization. Step 362 analyzes the returned data to determine whether there has been a change. If the answer is NO, a quick exit is made through step 363 to minimize the impact of the post-EXEC intercept 313' on completion of the API call.

If the answer to test 362 is instead YES, then in subsequent step 365 the "absolute value" of the positive or negative change amount in the number of allocation units (e.g., clusters) consumed by the file is used to calculate a revised average delta value for the current tally period (e.g., today's). Note that positive and negative changes of size do not cancel one another out. If the number of clusters or other allocation units consumed by a file first increases by one and later during the current tally period (e.g., the day) decreases by one, the average change over the two accesses is one rather than zero. If the average calculation produces a fraction, then in one embodiment, that fraction is rounded up to the nearest whole number. In subsequent step 366, the targeted file's record within the history log (or the record of the targeted group of files if the group statistics is being tracked) is updated to reflect the changed average. An exit of the post-EXEC intercept is then made at step 368 and the API call results are returned to the program which called the API function.

Figure 3D:
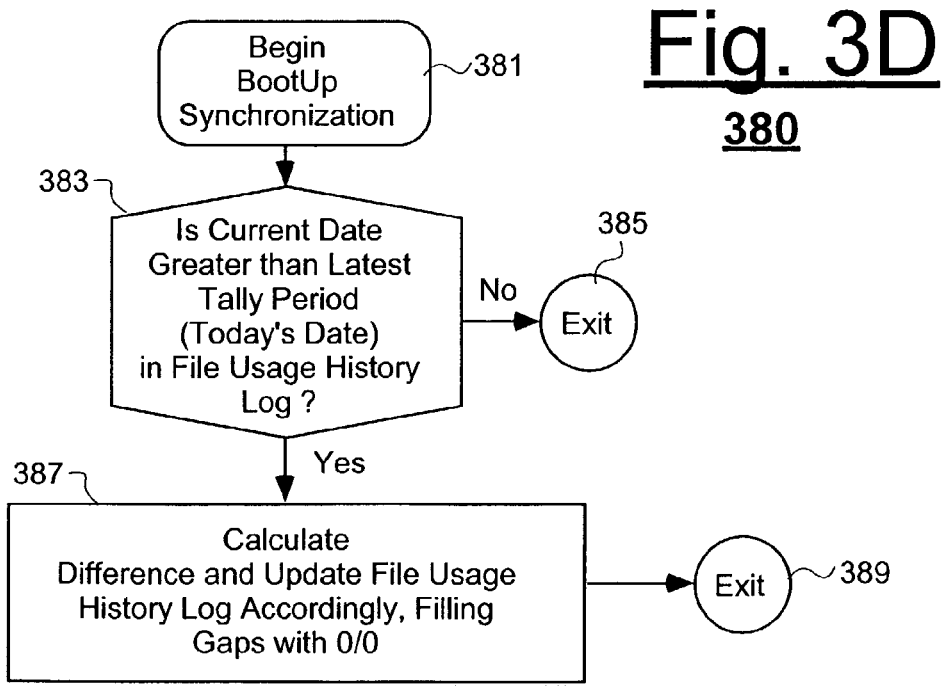
FIG. 3D is a flow chart of a start-up synchronizing algorithm in accordance with the disclosure that synchronizes a file usage log to current time in accordance to one embodiment.

Before explaining FIG. 3D, we will first describe a data structure 400 (FIG. 4) that may be recorded on a computer-readable media or otherwise defined and used for forming a file usage history log. In the illustrated example, we assume the length of a "current tally period" (421) has been pre-established for the given computer system as being one day (24 hours). We further assume for FIG. 4 that the represented time length of a "recent tallying span" (402) has been pre-established as being 14 times the current tally period, in other words, a collection of 14 days' worth of tallies including today's tally 421. The length of time represented by a "middling tally consolidation" 403 is assumed by way of example to have been pre-established as being older and more specifically covering about 1 to 2 times the time span covered by the recent span 402, for example, an additional 2 weeks' worth of older and average-wise consolidated information. Yet older, and further consolidated tally information is represented by data stored in an Old column 404. Since the middling tally consolidation column (403) covers WEEK-3 and WEEK-4 out of the last 4 weeks' worth of tracked information, and the recent span column (402) covers with finer resolution the tracked information of current WEEK-1 and that of the immediately preceding WEEK-2, the yet older and more consolidated information of Old column 404 covers data that has aged beyond WEEK-4, where the latter coverage may include an age-decaying weighting factor that favors more recent historical information over more aged historical information.

It is within the contemplation of the present disclosure to allow the end-user to establish other time spans for what is to be covered by the "current tally" record 421, the recent span column 402, the middling consolidation column 403, and the trailing end consolidation column 404. The examples given here have been empirically found to work well for a workstation that services an individual end user in a 7-days-per-week, 24 hours-per-day business setting. If machine use is guaranteed to be curtailed during certain hours of the day (e.g., 2 am–5 am) and/or during certain days of the week (e.g., weekends), and/or during special weeks (e.g., plant shutdown) and/or certain months (e.g., holiday months) of the year, then the size and/or covered time spans of the file usage log 400 may be reduced or otherwise appropriately adjusted so that storage space is not wasted tallying irrelevant time spans. Specialized algorithms may be included for filtering from the gathered statistics, the correspondingly irrelevant time spans.

Moreover, although the discussion here focuses on having each usage record (e.g., row 410) cover the usage of a respective single file, it is within the contemplation of the disclosure to define "groups" of files which are to be treated as a single entity by the utilization history gathering mechanisms, and to have a respective usage record for representing the utilization and/or size-volatility histories for a respectively defined group of files. For example, utilization and size-volatility history data may be kept collectively for a "folder" of files or further folders rather than for the individual files in that or a subfolder. Placement classification may be made for the folder-held files on the basis of the collective utilization and size-volatility history data of the folder rather than on the basis of utilization histories of the individual files. Thus, although the second record of exemplary log 400 shows it tracking the usage of a "FILE B", it could just as easily have instead been tracking a pre-specified GROUP B of files.

Figure 4:
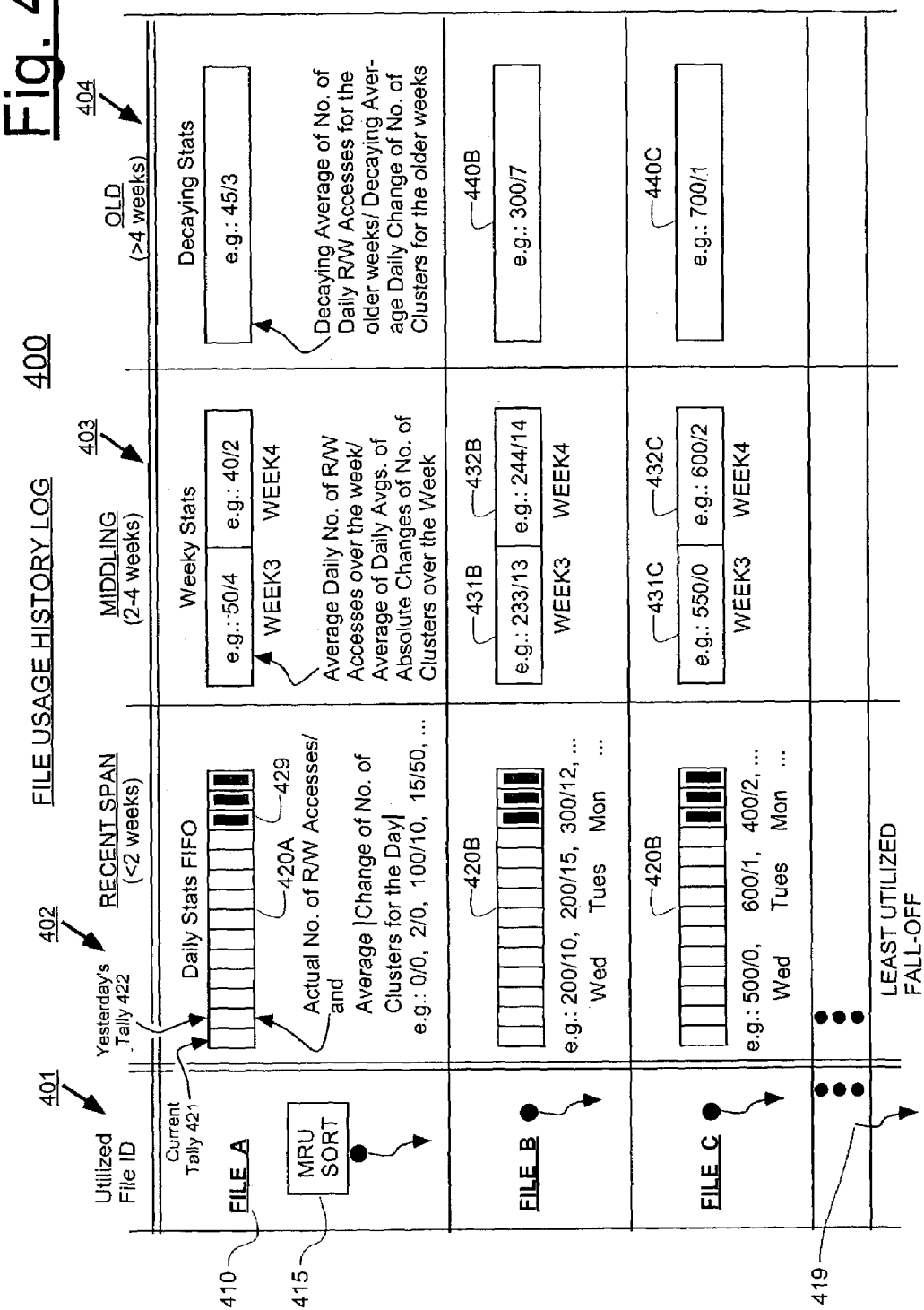
FIG. 4 is a schematic showing a data structure that may be used for forming a file usage log in accordance with one embodiment.

As seen in FIG. 4, a first table column 401 (or an equivalent data structure such as linked lists) specifies the identification 410 of a more or less frequently utilized file (e.g., FILE-A, or group of files) whose statistics are being gathered and maintained over the time spans represented by table columns 402–404. To keep the number of rows in the usage table 400 from extending beyond a predetermined, reasonable value (e.g., 1024, 2048, etc.), a least-utilized fall-off algorithm may be employed for automatically deleting (419) from the table those excess rows whose statistics indicate they are least often utilized within the recent span covered by column 402 and/or the middling span covered by column 430 as compared to others of the files tracked by table 400. A most-recently-used (MRU) sorting algorithm 415 can be employed to identify by way of linked list(s) or otherwise which identified files (and/or groups) are most recently utilized based on the files' statistics for the recent span 402 and/or the middling span 430. This MRU sort data 415 may be updated during relatively idle-use times of the machine and these may be used to help the LRU fall-off algorithm 419 and other algorithms (e.g., the defragger/placer 320 of FIG. 3) to better and/or more quickly perform their respective jobs of identifying more-often utilized and lesser-often utilized files/groups when they are called upon. For example, if the defragger/placer 320 is given only a short, predefined time period to complete its tasks, then such a mechanism 320 may want to prioritize its defragmenting and/or file placing activities to work first on the more-recently-used (MRU) files and to focus later, as time may permit, on less-utilized files of the tracked, recent period (402). The MRU sort data 415 can be used for carrying out such a defragmentation and/or placement-change prioritization process.

For each identified file (e.g., 410; or group of files), a corresponding; Regular-statistics Tallying FIFO (e.g., Daily Stats First-In/First-Out buffer 420A) may be provided in the recent-span column 402 for tallying up the current tally-period statistics 421 of that corresponding file/group and for storing in historic sequence the statistics of earlier tallies that fall within the recent time span (402). Historic time slots such as 429 that have not yet been filled because the current week (WEEK-1) is not over may be filled with nulls to indicate they are empty. When a FIFO such as 420A fills up with 2 weeks worth of collected data, the older, WEEK-2 data (7–13 days old) may be compressed, such as by uniformly-weighted or other forms of averaging, and pushed into the WEEK-3 consolidated slot of middling consolidation column 403. Of course, before the latter push is performed, the WEEK-4 consolidated data (e.g., 432B) of that row's column 403 should be compressively merged into the time-decaying statistics of trailing-end consolidation column 404, using an appropriate information compressing algorithm such as age-weighted averaging, and the WEEK-3 data should be similarly pushed beforehand into the WEEK-4 slot.

The current tally-period statistics slot 421 (Today's tally) should contain at least a count or another indication of the actual number of data-seeking utilizations that were so-far made of the corresponding file (410) during the current tally period and a running average or an actual tracking indication of the absolute values of cluster-number re-sizings (size deltas) made thus far in the current tally period for the corresponding file (410). In one embodiment, the latter indication is in terms of the average of the absolute values of the changes (deltas) in the file's number of consumed clusters as such may be tallied for the given day. In the examples shown for FILE-A, FILE-B, and FILE-C, the respective number of utilizations in the current tally period (assumed to be Wednesday) is 0 times, 200 times and 500 times. Thus it is seen that of the three, FILE-C was the most utilized on that given day. Further in the examples shown for FILE-A, FILE-B, and FILE-C, the respective resizing deltas were: 0 clusters, 10 clusters and 0 clusters. Thus it is seen that of the three, FILE-B was the most volatile, and in fact neither of FILE-A and FILE-C was resized on that day. On the preceding day (Tuesday), however, FILE-C was resized by 1 cluster, and the day before (Monday) by 2 clusters. If taken alone, the Monday tallies would have given a false impression that FILE-C is size-wise nonvolatile. However the most recent 3-day average for FILE-C indicates it resized by about 1 cluster per day. If taken, the most recent 4-day average for FILE-A would indicate it is resized by about 15 clusters per day. But that can be misleading because the long-term values kept in middling consolidation column 403 and trailing-end consolidation column 404 indicate that, over the long haul, FILE-A is resized by about 3 clusters per day.

There is no one correct way to process all these statistics. The main point is that the exemplary file usage log 400 in FIG. 4 provides a more precise depiction of the number of actual file READs, WRITEs, or other actual utilizations made of each tracked file (or group of files) without blurring into the picture, irrelevant information about how many references such as file OPENs and file CLOSEs may have been made. The exemplary file usage log 400 also provides a clearer indication than does the traditional, LAST-MODIFIED data of conventional OS's regarding how volatile the allocated size of each utilized file is. This information helps the classifier 322 of FIG. 3A to make better informed decisions about which of categories A–F each given file should be assigned to.

Referring to FIG. 3D, a method 380 is described for dealing with situations where the computer is turned off from time to time and therefore might not continuously make periodic entries into the file-usage log. At step 381, the system bootup procedure is structured to include a call to the illustrated, file-usage log synchronization test 383. If test 383 shows that the current time and date is not beyond the latest tally period of the current file-usage log, a quick exit from the call is made via step 385. On the other hand, if the answer is YES to test question 383: Is current date/time greater than Latest Tally Period?, then control passes to step 387.

Figure 5:
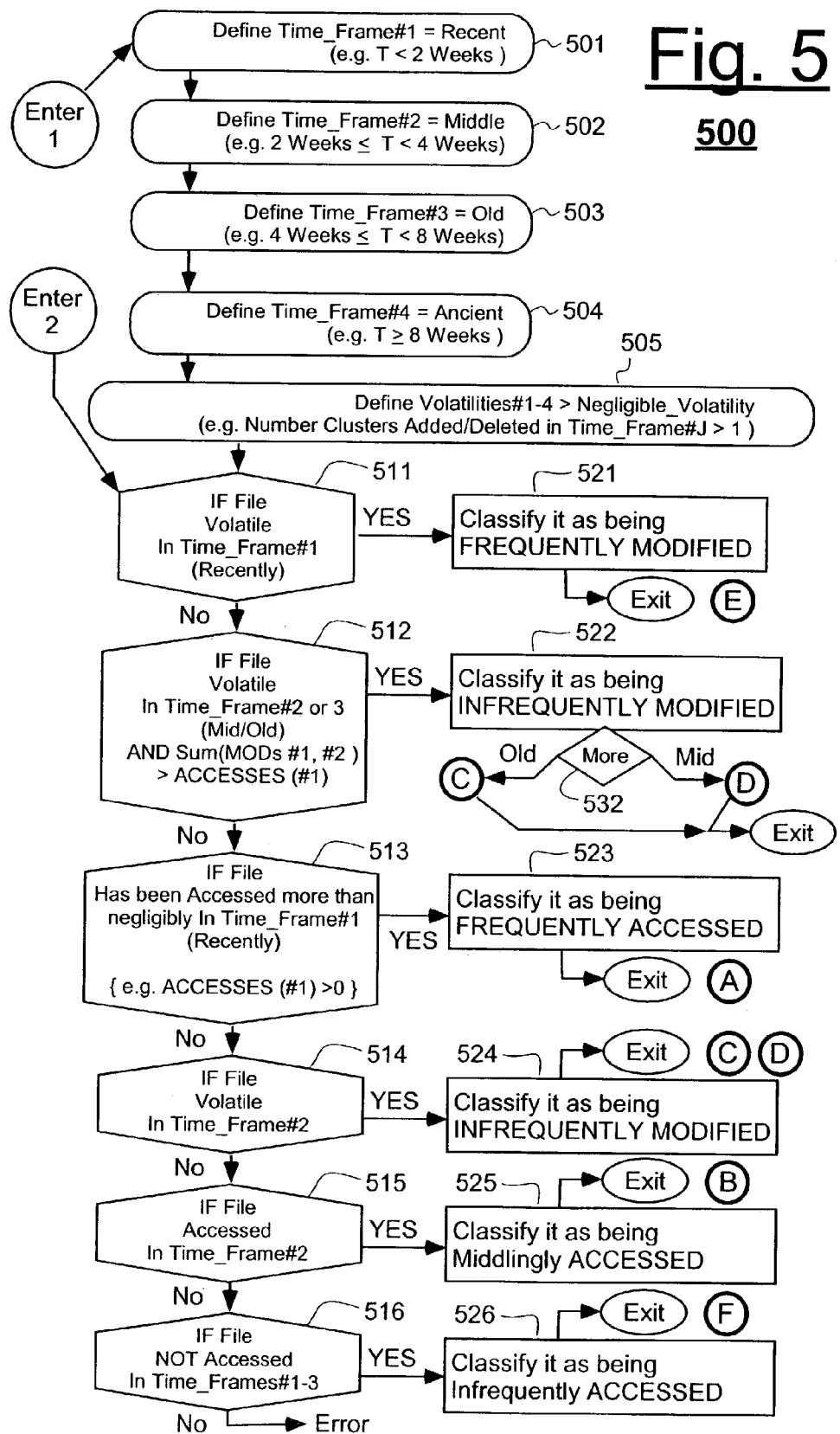
FIG. 5 is a flow chart of a file classifying algorithm that may be automatically carried out by an instructable machine in accordance to one embodiment.

Referring to FIG. 5, the flow chart of a first classifying algorithm 500 is illustrated in accordance to one embodiment. First time entry is made into initialization step 501 where the definition of what Time Frame constitutes a Recent such duration is made, for example T<2 weeks. (This value can vary with context. Thus in a different environment, "Recent" might be user defined as T<2 days or T<5 hours or T<1 month.) Initialization step 502 provides a context dependent definition of what Time Frame (number 2) constitutes a "Middling" such duration, for example 2 weeks T<4 weeks. Initialization step 503 provides a context dependent definition of what Time Frame (number 3) constitutes an "Old" such duration, for example 4 weeks T<8 weeks. Initialization step 504 provides a context dependent definition of what Time Frame (number 4) constitutes an "Ancient" such duration, for example 8 weeks T. In one embodiment, step 504 is bypassed.

In step subsequent 505, one or more definitions are created for what kind of file-size volatility is to be recognized as being a non-negligible amount of volatility. In one embodiment for example, if file size changes by no more than 1 cluster in the corresponding time frame (e.g., no more than 1 cluster is added to or subtracted from the file size over the course of the time frame) then that change in file-size is considered negligible (ignorable) and the file is said to be non-volatile. On the other hand, if the sum of the absolute values of file-size changes exceeds the amount which is user-defined as ignorable (negligible) then the file is said to be a Volatile one. As is the case with determining in steps 501–504 what constitutes a "Recent" time frame versus a "Middling" versus others, the determination of what constitutes "Volatile" or not can be context dependent. In one embodiment, each time frame (e.g., TF#1 through TF#4) is independently assigned a respective Negligible-Volatility threshold value (e.g., NV#1=0, NV#2=2, NV#3=5, NV#4=10) for defining what minimal amount of file-size change can be regarded as being negligible in the corresponding time frame (e.g., TF#1 through TF#4). It is of course within the contemplation of the disclosure to have more or fewer numbers of defined time frames and/or corresponding Negligible-Volatility threshold values.

After appropriate definitions are established in steps 501–505, further entries into the classifier algorithm 500 may be made via step 511. The classifier algorithm 500 classifies an identified file based on amount of access to the file and the file's modification history. A file history log such as shown in FIG. 4 may be utilized to convey these two pieces of information, namely: How many times the identified file was accessed in the corresponding time frame, and how many times its size was non-negligibly modified in that same period. In one embodiment, six possible classifications are provided for each analyzed file as is shown by classification outcomes 521–526 in FIG. 5. A similar breakdown is shown in below Table 1. In one embodiment, number of accesses is also measured from an Negligible-Accesses threshold value for all or respective ones of the time frames. For example, one access in a given time frame may be forgiven and not counted towards the number of non-negligible Accesses found for the corresponding time frame. Size-Volatility is considered ahead of Accesses only if Volatility has not been recorded in the lesser columns. Ancient volatility is not considered.

TABLE 1

| CLASS | FILE HISTORY |
|---|---|
| Frequently Accessed, Non-volatile | Accessed, but not modified, within Recent timeframe |
| Middlingly Accessed, Non-volatile | Accessed, but not modified, within Middling timeframe |
| Infrequently Modified | Modified in Middling, but not in Recent, timeframe |
| Frequently Modified | Modified in Recent timeframe |
| Infrequently Accessed, Non-volatile | Accessed or Modified in Ancient timeframe |
| Unclassified | Any file not one of the above. |

Table 2 shows an example where six to-be-classified files are identified as Files 11–16. The raw file utilizations and raw volatilities (negligible utilizations/size-changes not yet filtered out) are logged historically and denoted in the table on respective left and right sides of the slash-separated ("/"-separated) entries. In this example, volatility trumps utilization for classification purposes. Accordingly, for added visual distinction, entries containing non-negligible Volatilities are marked with a capital "V" on their right sides. Entries containing non-negligible utilizations (R/W accesses) are marked with an "a" on their right sides. The below set forth, Sample-Classifier classification algorithm can use the log entries to appropriately classify each file.

TABLE 2

| | {Utilizations}/{Size-Volatilities} | | | |
|---|---|---|---|---|
| FILE ID | In Recent Time Frame (<2 weeks) | Middling Time Frame (2 B 4 weeks) | Old Time Frame (4 B 8 weeks) | Ancient >8 weeks |
| File 11 [A] | 0/0 | 3/0    a | 5/2    V | N/A |
| File 12B | 1/0 | 10/2   V | 3/1    a | N/A |
| File 13C | 100/0  a | 3/1    a | 5/1    a | N/A |
| File 14D | 100/100 V | 10/10  V | 5/0    a | N/A |
| File 15E | 100/0  a | 100/10 V | 100/10 V | N/A |
| File 16F | 0/0 | 0/0 | 0/0 | N/A |

Sample-Classifier Algorithm
1. If a file has been Volatile in the Recent time period, classify it as being Frequently Modified and return.
2. Else, if it has been Volatile in the Middling and Old time frames, and the sum of those modifications is greater than the Accesses in the Recent time frame, classify it as being Infrequently Modified and return.
3. Else, if a file has been Accessed in the Recent time frame, classify it as being Frequently Accessed and return.
4. Else, if it has been Volatile in the Middling time frame, classify it as being Infrequently Modified and return.
5. Else, if it has been Accessed in the Middling time frame, classify it as being Middling Accessed and return.
6. Else, if it has not been Accessed or Volatile in the Recent, Middling, or Old time frame, classify it as being Infrequently Accessed and return.
7. Else, classify it as being Unclassified and return. (The Ancient column is not used {N/A} in this example of a classification algorithm.)

Given this, Table 3 shows how the sample Files 11–16 of Table 2 would be automatically classified by sequencing through steps 1–6 of the Sample-Classifier algorithm:

TABLE 3

| File | 1 | 2 | 3 | 4 | 5 | 6 | Classification |
|---|---|---|---|---|---|---|---|
| File 11 | — | — | — | — | X | | Infrequently Accessed (F) |
| File 12 | — | — | — | X | | | Infrequently Modified (C/D) |
| File 13 | — | — | X | | | | Frequently Accessed (A) |
| File 14 | X | | | | | | Frequently Modified (E) |
| File 15 | — | — | X | | | | Frequently Accessed (A) |
| File 16 | — | — | — | — | — | — | Unclassified |

The right-most letter entries (A–F) in sample Table 3 may be seen as corresponding to the circled letter entries (A–F) in regions 371–376 of FIG. 3A. The example did not find a file that was middlingly accessed and thus categorized for placement in region 372 (B).

Classification steps 511–516 of FIG. 5 follow a substantially similar approach. If the identified file is found in step 511 to have been non-negligibly Volatile in the first time frame (#1) then step 521 classifies the file as being Frequently Modified and thus slated for placement in region E (374) of FIG. 3A. The illustrated classifier algorithm 500 then exits. If test step 511 produces a False (No) result, control passes to step 512.

In step 512, a machine-implemented test is conducted to see if the identified file should be categorized as Infrequently Modified. In one embodiment, this done by summing the absolute quantities of size-modifications in time frames #2 and #3 and comparing the sum to the number of non-negligible utilizations made in time frame #1. If the sum is greater, then control is passed to step 522 where the algorithm 500 classifies the file as being Infrequently Modified. Step 532 may be included for better defining where placement should be made, closer to or in region C (373c) versus closer to or in region D (373d) of FIG. 3A. If the inequality between volatilities and utilizations is due more so to volatilities in the Old time frame (#3) rather than the Middling time frame (#2), then placement in C is suggested prior to the exit. On the other hand, if it is due more so to volatilities in the Middling time frame (#2), then a placement in D is suggested by the variables returned via the exit. The classifying discriminator in step 512 is of course merely an example. Other tests based on volatilities versus utilizations in individual ones of the time frames may be used and/or more detailed placement suggestions can be returned by the classification algorithm 500 based on the numeric calculations it makes in determining an appropriate classification of each file.

When control passes to step 513, the classification algorithm 500 has effectively decided that the identified file should not be categorized as either Frequently Modified or as Infrequently Modified. The next test is to see if the file is nonetheless classifiable as being Frequently Utilized. One simple test is shown in box 513 where the machine-implemented method 500 tests to see if the utilization count in the Recent time frame (# 1) is more than negligible. If yes, the file is classified as being Frequently Utilized is step 523 and thus slated for placement in region A (371) of FIG. 3A. The illustrated classifier algorithm 500 then exits. If test step 513 produces a False (No) result, control passes to step 514.

In step 514, a machine-implemented test is conducted to see if the identified file should be categorized as Infrequently Modified and not Frequently Utilized. One simple test is shown in box 514 where the machine-implemented method 500 tests to see if the volatility count in the Middle time frame (#2) is more than negligible. If yes, the file is classified as being Infrequently Modified is step 524 and thus slated for placement in one of regions C, D (373) of FIG. 3A. A more precise placement suggestion may be formulated similar to that done in step 532 before the illustrated classifier algorithm 500 exits. If test step 514 produces a False (No) result, control passes to step 515.

In step 515, a machine-implemented test is conducted to see if the identified file should be categorized as Middlingly Utilized although not Vlotile not Frequently Utilized. One simple test is shown in box 515 where the machine-implemented method 500 tests to see if the utilization count in the Middle time frame (#2) is more than negligible. If yes, the file is classified as being Middlingly Accessed and substantially non-Volatile in step 525 and thus slated for placement in region B (372) of FIG. 3A.

When control passes to step 516, the classification algorithm 500 should have effectively winnowed out all possibilities except that for Ancient files. The test in box 516 verifies that the subject file has not been Utilized in a non-negligible way in any of time frames #1 through #3. If this is true (Yes), then the file is classified as being Infrequently Accessed and substantially non-Volatile in step 526 and thus slated for placement in region F (376) of FIG. 3A. If this is not true (No) then a processing error may have occurred and this is signaled for error handling by appropriate error handling software.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example of a further modification in accordance with the disclosure, more precise placement suggestion algorithms may be empirically devised for suggesting where each file should be placed based on its utilization and/or volatility history as well as cross-corellated utilization and/or volatility histories of files it interacts with. In other words, the history log may be expanded to have finer time divisions (e.g., very recently utilized, fairly recently, etc.) which will show cross-correlation data about which files tend to be utilized in close temporal proximity to one another. This would indicate that perhaps they should be placed close to one another. The classification algorithm can make placement suggestions for the file placement plan based on such temporal cross-correlation factors.

It is to be understood from the overall disclosure that the configuring of an instructable machine and/or data storage media associated with the machine and/or data and/or instructing signals manufactured for operative use by the machine in carrying out one or more operations in accordance with the disclosure can include the use of a general purpose and/or specialized computer (e.g., 100 of FIGS. 1–2) in combination with a computer-readable medium (e.g., 175, 171) or another form of a software product or machine-instructing means (including but not limited to, a hard disk, a compact disk, a flash memory stick, a downloading of manufactured instructing signals over a network (e.g., 190) and/or like software products) and that such may be used for instructing the instructable parts of the machine (e.g., 150) to carry out various ones of history logging and placement planning and placement activities (e.g., 305, 322, 320) in accordance with the disclosure. Configuration data may be seen as defining manufactured configuration control signals which can be conveyed via appropriate signal transporting devices (190, 175) to means that carry out the desired file placements. As such, it is within the scope of the disclosure to have an instructable machine carry out, and/to provide a software product adapted for causing an instructable machine to carry out a machine-implemented method comprising: (a) determining what regional placements (e.g., FIG. 3A) of files are desired for files of different utilization and/or volatility histories in variable-rate storage devices; (b) collecting (e.g., 311) utilization and/or volatility histories of utilized files; (c) maintaining a file usage log (e.g., 305, 400); and (d) at or near the time of file placement or re-placement, determining what placement to plan for each file based on the maintained file usage log.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A differential rate memory device having regions of comparatively faster data access and of comparatively slower data access for storing data files in such regions, where said differential rate memory device comprises:
   a first set of relatively frequently utilized files situated in a corresponding, relatively fastest and first access region of the memory device;
   a second set of relatively infrequently utilized files situated in a corresponding, relatively slowest and second access region of the memory device;
   one or more free spaces positioned between said first and second access regions of the memory device, each of the one or more free spaces being essentially free of data belonging to undeleted files; and
   a file-utilization tracking log which tracks at least recent history of content utilizing and/or re-sizing references made to files stored in the comparatively faster data access regions and the comparatively slower data access regions of the differential rate memory device.

2. The differential rate memory device of claim 1 wherein:
   the file-utilization tracking log further tracks at least recent history of size volatility of the files stored in the comparatively faster and slower data access regions of the differential rate memory device.

3. The differential rate memory device of claim 1 and further comprising:
   a third set of relatively frequently re-sized files situated adjacent to at least a first of the one or more free spaces.

4. The differential rate memory device of claim 3 and further comprising:
   a fourth set of relatively infrequently re-sized files situated between the comparatively, more frequently re-sized files of the third set and the comparatively, more frequently utilized files of the first set.

5. The differential rate memory device of claim 4 and further comprising:
   a fifth set of relatively middlingly utilized and relatively size-wise nonvolatile files situated between the comparatively, more frequently re-sized files of the fourth set and the comparatively, more frequently utilized files of the first set.

6. The differential rate memory device of claim 4 wherein:
   the file-utilization tracking log further tracks at least recent history of size volatility of the files stored in the comparatively faster and slower data access regions of the differential rate memory device.

7. A file placement method for use with a differential rate memory device having regions of comparatively faster data access and of comparatively slower data access for storing retrievable data file contents in such regions, where said file placement method comprises:
   placing a first set of relatively frequently utilized files in a corresponding, relatively fastest and first access region of the memory device;
   placing a second set of relatively infrequently utilized files in a corresponding, relatively slowest and second access region of the memory device;
   providing one or more free spaces positioned between said first and second access regions of the memory device, each of the one or more free spaces being essentially free of data belonging to undeleted files; and
   basing the placings on file-utilization data provided by a file-utilization tracking log which tracks at least recent history of content utilizing and/or re-sizing references made to files stored in the comparatively faster and comparatively slower data access regions of the differential rate memory device.

8. The file placement method claim 7 wherein:
   the file-utilization tracking log further tracks at least recent history of size volatility of the files stored in the comparatively faster and slower data access regions of the differential rate memory device; and
   said basing further bases the placement of the first and second set of files on file-volatility data provided by the file-utilization tracking log.

9. The file placement method of claim 7 and further comprising:
   placing a third set of relatively frequently re-sized files in a beachhead region adjacent to a volatile boundary of at least a first of the one or more free spaces.

10. The file placement method of claim 9 and further comprising:
    placing a forth set of relatively infrequently re-sized files in a moderate volatility region between the comparatively, more frequently resized files of the beachhead region and the comparatively, more frequently utilized files of the first region.

11. The file placement method of claim 10 and further comprising:
    placing a fifth set of relatively middlingly utilized and relatively size-wise nonvolatile files in a middling region between the comparatively, more frequently re-sized files of the moderate volatility region and the comparatively, more frequently utilized files of the first region.

12. The file placement method of claim 10 wherein:
    the file-utilization tracking log further tracks at least recent history of size volatility of the files stored in the comparatively faster and slower data access regions of the differential rate memory device; and
    said basing further bases the placement of the first and second set of files on file-volatility data provided by the file-utilization tracking log.

13. A differential rate memory device having respective data storage and retrieval regions which are comparatively characterized by respective faster and slower data access speeds; where said comparatively faster and slower regions store contents of data files, said differential rate memory device comprising:
    a file-utilization tracking log which tracks at least recent history of content utilizing and/or re-sizing references made to files stored in the comparatively faster and slower data access regions of the differential rate memory device.

14. The differential rate memory device of claim 13 wherein:
    the file-utilization tracking log further tracks at least recent history of size volatility of the files stored in the comparatively faster and slower data access regions of the differential rate memory device.

15. The differential rate memory device of claim 14 wherein:
    the file-utilization tracking log is logically divided to track different time frames, one of said time frames defining said recent history of size volatility and content utilization of the files stored in the comparatively faster and slower data access regions and a second of said time frames defining an older time frame for which such size volatility and content utilization is tracked, where tracking data in said at least one older time frame has lower resolution of time versus size volatility and content utilization than does tracking data in said recent history.

16. A file-utilization tracking method which may be used in combination with a differential rate memory device having regions of comparatively faster data access and of comparatively slower data access for storing retrievable data file contents in such regions, where said file-utilization tracking method comprises:
   intercepting file-access requests;
   for each intercepted request, first determining whether the requested access will utilize/re-size or has utilized/re-sized file data contents or not of a correspondingly referenced file or a correspondingly-referenced group of files; and
   in response to an indication by said first determining that the requested access will, or has utilized file data contents, updating a file-utilization history log record of the referenced file or referenced group of files to indicate an increased amount of utilization and/or size volatility for the referenced file or group of files.

17. The file-utilization tracing method of claim 16 and further comprising:
   prior to invoking said history log record updating step, second determining whether the requested access is referencing a file or group of files which is pre-identified by name and/or type as a respective file or group that is to be excluded from having its utilization history being logged by said history log record updating step, and if said second determining indicates that the referenced file or group of files is to be excluded, bypassing said history log record updating step.

18. The file-utilization tracking method of claim 16 and further comprising:
   prior to invoking said history log record updating step, second determining whether a history log record exists for the referenced file or group of files, and if not, creating a respective history log record for the respectively referenced file or group of files.

19. The file-utilization tracking method of claim 18 and further comprising:
   when creating said respective history log record, filling the created history log record with mock history data.

20. The file-utilization tracking method of claim 16 and further comprising:
   second determining either before or after the requested access is carried out whether the referenced file respectively will, or has had its storage allocation size changed; and if not, bypassing an updating of volatility information recorded in the respective history log record for the respectively referenced file or group of files.

21. The file-utilization tracking method of claim 20 and further comprising:
   if said second determining indicates that the storage allocation size of the referenced file respectively will, or has changed, updating the volatility information recorded in the respective history log record for the respectively referenced file or group of files.

22. The file-utilization tracking method of claim 21 and further comprising:
   using said history log records to automatically classify the correspondingly tracked files or group of files as being comparatively frequently or infrequently utilized.

23. The file-utilization tracking method of claim 22 and further comprising:
   using said history log records to automatically classify the correspondingly tracked files or group of files as being comparatively volatile or not volatile with respect to their storage allocation sizes changing over time.

24. The file-utilization tracking method of claim 16 and further comprising:
   detecting a period of dormancy such as system power-off during which file utilization and utilization tracking are dormant; and
   updating historical information recorded in the respective history log records of files or group of files whose utilization was dormant during the period of dormancy to reflect the period of dormancy.

25. A file-volatility tracking method which may be used in combination with a differential rate memory device having allocatable storage units disposed in regions of comparatively faster data access and of comparatively slower data access for storing retrievable data file contents in such regions, where said file-volatility tracking method comprises:
   intercepting file-access requests;
   for each intercepted request, first determining whether the requested access will cause or has caused a change in the number of allocatable storage units consumed by file data contents of a correspondingly referenced file or a correspondingly-referenced group of files, and if so, further determining at least approximately, the magnitude of such a positive or negative change in number of consumed storage units; and
   in response to an indication by said first determining that the requested access will, or has changed the number of allocatable storage units, updating a file-tracking history log record of the referenced file or referenced group of files to indicate an amount of size volatility versus time for the referenced file or group of files.

26. The file-volatility tracking method of claim 25 and further comprising:
   prior to invoking said history log record updating step, second determining whether the requested access is referencing a file or group of files which is pre-identified by name and/or type as a respective file or group that is to be excluded from having its volatility history being logged by said history log record updating step, and if said determining indicates that the referenced file or group of files is to be excluded, bypassing said history log record updating step.

27. The file-volatility tracking method of claim 25 and further comprising:
   prior to invoking said history log record updating step, second determining whether a history log record exists for the referenced file or group of files, and if not, creating a respective history log record for the respectively referenced file or group of files.

28. The file-volatility tracking method of claim 27 and further comprising:
   when creating said respective history log record, filling the created history log record with mock volatility history data.

29. A manufactured storage media having a files-utilization tracking log recorded therein, where said tracking log may be cooperatively used in combination with a differential rate memory device having allocatable storage units disposed in regions of comparatively faster data access and of comparatively slower data access for storing retrievable data file contents in such regions, where said files-utilization tracking log of the storage media comprises:

a plurality of tracking records each for tracking utilization and/or size volatility of a corresponding file or a corresponding group of files;

where utilization involves at least actual reading of data from contents of at least one of said corresponding files or actual writing of new data contents to at least one of said corresponding files; and where size volatility involves a change in the number of allocatable storage units consumed by file data contents of at least one of said corresponding files; and where each tracking record comprises:

at least a first record section adapted for keeping track of recent utilization and/or recent size volatility of a corresponding file or a corresponding group of files in a predefined recent time frame; and at least a second record section adapted for keeping track of older utilization and/or older size volatilities of the corresponding file or the corresponding group of files which took place in a predefined older time frame occurring at least partially before the predefined recent time frame.

30. The storage media of claim 29 and further where each tracking record comprises:

at least a third record section adapted for keeping track of yet older utilization and/or yet older size volatilities of the corresponding file or the corresponding group of files which took place in a predefined, yet older time frame occurring at least partially before the predefined older time fame.

31. The storage media of claim 30 and further wherein:

said predefined older time frame covers a time period at least as long as that covered by the predefined recent time frame; and said predefined, yet older time frame covers a longer time period than that covered by the older time frame.

32. The storage media of claim 30 and further wherein:

said third record section is adapted to provide an age-decaying representation of the yet older utilization and/or yet older size volatilities of the corresponding file or the corresponding group of files, where the age-decaying representation emphasizes representation of more recent historical information over more aged historical information.

33. The storage media of claim 29 and further wherein:

the plurality of tracking records of the files-utilization tracking log are logically organized according to recent and/or older utilization histories such that a least-utilized fall-off algorithm can be employed for automatically deleting from the log, excessive numbers of rows whose statistics indicate they are least often utilized within the recent time frame and/or the middling time frame as compared to others of the files or groups of files tracked by other records, where excessive records are those beyond a predefined records limit of the files-utilization tracking log.

34. The storage media of claim 29 wherein:

the plurality of tracking records of the files-utilization tracking log are logically organized as linked lists which are automatically sort-able to identify which files or groups of files are recently more utilized or utilized to a lesser extent based on the historical statistics gathered for said corresponding files or corresponding groups of files within the recent time frame and/or the middling time frame.

35. A machine-implemented, files re-positioning method for repositioning files within a differential rate memory device, where the memory device has allocatable storage units disposed in regions of comparatively faster data access and of comparatively slower data access for storing retrievable data file contents in such regions, where said files re-positioning method comprises:

accessing a files-utilization tracking log whose tracking records are logically organized according to which files or groups of files are recently more utilized/re-sized or utilized/resized to a lesser extent based on the historical statistics gathered for said corresponding files or corresponding groups of files within one or more time frames covered by the files-utilization tracking log; and prioritizing file re-positioning activities to work first on re-positioning and/or defragmenting identified files or groups of files whose tracking records are logically organized to indicate that those identified files or groups of files are recently more utilized relative to other files which may also benefit from re-positioning and/or defragmenting.

36. A machine-implemented, files utilization tracking method comprising:

providing a files-utilization tracking log, where said tracking log may be cooperatively used in combination with a differential rate memory device having allocatable storage units disposed in regions of comparatively faster data access and of comparatively slower data access for storing retrievable data file contents in such regions, where said files-utilization tracking log comprises:

a plurality of tracking records each for tracking utilization and/or size volatility of a corresponding file or a corresponding group of files, where utilization involves at least actual reading of data from contents of at least one of said corresponding files or actual writing of new data contents to at least one of said corresponding files;

where size volatility involves a change in the number of allocatable storage units consumed by file data contents of at least one of said corresponding files; and where each tracking record has:

at least a first record section structured for keeping track of recent utilization and/or recent size volatility of a corresponding file or a corresponding group of files in a predefined recent time frame; and at least a second record section structured for compressively keeping track of older utilization and/or older size volatilities of the corresponding file or the corresponding group of files which took place in a predefined older time frame occurring before the predefined recent time frame; and when a first record section fills up with tracking data fully covering said predefined recent time frame, compressing tracking data of an older part of the first record section and shifting the compressed tracking data to the second record section to thereby create free storage area in the first record section for maintaining more current tallies.

37. A machine-implemented, file utilization classifying method comprising:

defining a first time frame as constituting a recent time frame;

defining an older second time frame as constituting a middling time frame;

providing a files-utilization tracking log, where said tracking log may be cooperatively used in combination with a differential rate memory device having allocatable storage units disposed in regions of comparatively faster data access and of comparatively slower data access for storing retrievable data file contents in such regions, where said files-utilization tracking log comprises:

a plurality of tracking records each for tracking utilization and/or size volatility of a corresponding file or a corresponding group of files, where utilization involves at least actual reading of data from contents of at least one of said corresponding files or actual writing of new data contents to at least one of said corresponding files;

where size volatility involves a change in the number of allocatable storage units consumed by file data contents of at least one of said corresponding files; and where each tracking record has:

at least a first record section structured for keeping track of recent utilization and/or recent size volatility of a corresponding file or a corresponding group of files in the recent time frame; and at least a second record section structured for keeping track of older utilization and/or older size volatilities of the corresponding file or the corresponding group of files which took place in the middling time frame; and first determining from the files-utilization tracking log if an identified file or group of files has experienced a non-negligible amount of size-volatility in the recent time frame, and if so, classifying the identified file or group of files as being frequently modified.

38. The file utilization classifying method of claim 37 and further comprising:

second determining from the files-utilization tracking log if an identified file or group of files has experienced a non-negligible amount of utilization in the recent time frame, and if so, classifying the identified file or group of files as being frequently utilized.

39. The file utilization classifying method of claim 38 and further comprising:

third determining from the files-utilization tracking log if an identified file or group of files has experienced a non-negligible amount of size-volatility in the middling time frame but not in the recent time frame, and if so, classing the identified file or group of files as being infrequently modified.

40. A machine readable medium having instructions stored thereon that when executed by a processor cause a system to:

place relatively frequently utilized but size-unmodified files in a corresponding, relatively fastest and first access region of the memory device;

place relatively infrequently utilized and size-unmodified files in a corresponding, relatively slowest and second access region of the memory device;

create one or more free spaces positioned between said first and second access regions of the memory device, each of the one or more free spaces being essentially free of data belonging to undeleted files; and wherein said first and second placings an file-utilization data provided by a file-utilization tracking log which tracks at least recent history of content utilizing and/or re-sizing references made to files stored in the comparatively faster and comparatively slower data access regions of the differential rate memory device.

* * * * *